United States Patent
Li et al.

(10) Patent No.: US 11,163,427 B2
(45) Date of Patent: Nov. 2, 2021

(54) METHOD AND DEVICE FOR DISPLAYING APPLICATION INFORMATION, MOBILE TERMINAL, AND STORAGE MEDIUM

(71) Applicant: BEIJING XIAOMI MOBILE SOFTWARE CO., LTD., Beijing (CN)

(72) Inventors: Jiayan Li, Beijing (CN); Zhenzhou Lu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/844,882

(22) Filed: Apr. 9, 2020

(65) Prior Publication Data

US 2020/0341603 A1 Oct. 29, 2020

(30) Foreign Application Priority Data

Apr. 28, 2019 (CN) .......................... 201910351110.5

(51) Int. Cl.
*G06F 3/0484* (2013.01)

(52) U.S. Cl.
CPC .................................. *G06F 3/0484* (2013.01)

(58) Field of Classification Search
CPC ................................................... G06F 3/0484
USPC ........................................................ 715/733
See application file for complete search history.

(56) References Cited

U.S. PATENT DOCUMENTS

| | | | | |
|---|---|---|---|---|
| 9,317,190 B2 * | 4/2016 | Kwak | ..................... | G06F 3/017 |
| 10,114,519 B2 * | 10/2018 | Silvis | ..................... | G06F 3/0484 |
| 10,620,690 B2 * | 4/2020 | Lee | ..................... | G09G 5/10 |
| 10,736,042 B2 * | 8/2020 | Lee | ..................... | G06F 1/1652 |
| 10,937,392 B2 * | 3/2021 | Choi | ..................... | G06F 1/1652 |
| 2014/0300533 A1 * | 10/2014 | Cho | ..................... | G06F 1/1647 345/156 |
| 2015/0365509 A1 | 12/2015 | Park | | |
| 2016/0225346 A1 * | 8/2016 | Choi | ..................... | G06F 3/1423 |
| 2017/0255272 A1 * | 9/2017 | Flagg | ................. | G06F 3/04883 |
| 2018/0356950 A1 * | 12/2018 | Bian | ................... | G06F 3/04842 |

(Continued)

FOREIGN PATENT DOCUMENTS

| | | |
|---|---|---|
| EP | 3367230 A1 | 8/2018 |
| EP | 3454198 A1 | 3/2019 |

OTHER PUBLICATIONS

Extended European Search Report issued to European Application No. 20171584.4 dated Sep. 16, 2020 (7p).

*Primary Examiner* — William D Titcomb
(74) *Attorney, Agent, or Firm* — Arch & Lake LLP

(57) ABSTRACT

A method and a device for displaying application information, a mobile terminal, and a storage medium are provided. The mobile terminal includes a first display screen and a second display screen, where the first display screen is disposed on an upper surface of a housing of the mobile terminal and the second display screen is disposed on a first side surface of the housing. The method includes displaying a current interface on the first display screen, the current interface being an interface corresponding to a first application running in foreground of the mobile terminal, obtaining, at the mobile terminal during the display of the current interface on the first display screen, information of a second application, where the second application is installed on the mobile terminal, and displaying, on the second display screen of the mobile terminal, the information of the second application.

18 Claims, 15 Drawing Sheets

(56) References Cited

U.S. PATENT DOCUMENTS

2019/0332232 A1\* 10/2019 Lu .......................... G06F 9/451
2019/0342442 A1\* 11/2019 Coverstone ....... H04M 1/72409

\* cited by examiner

METHOD AND DEVICE FOR DISPLAYING APPLICATION INFORMATION, MOBILE TERMINAL, AND STORAGE MEDIUM

CROSS-REFERENCE

This application is based upon and claims priority to Chinese Patent Application No. 201910351110.5, filed on Apr. 28, 2019, the entire contents thereof are incorporated herein by reference.

TECHNICAL FIELD

The present disclosure relates to the field of terminal technologies, and in particular, to a method and a device for displaying application information, a mobile terminal, and a storage medium.

BACKGROUND

With the rapid development of terminal technologies, functions of a mobile terminal are increasing. Multiple applications can be installed on the mobile terminal. While the mobile terminal is running an application in foreground, it can also run other applications in background. For example, while the mobile terminal is running a video playing application in the foreground, it can also run a map application in the background.

In the related art, the mobile terminal includes a housing, a display screen, and a processor. The processor is disposed in the housing, and the display screen is disposed on an upper surface of the housing. The display screen is configured to display a current interface corresponding to a first application running in the foreground. When a user wants to view an interface corresponding to a second application running in the background, the user manually switches the interface.

SUMMARY

The present disclosure provides a method and a device for displaying application information, a mobile terminal, and a storage medium.

According to a first aspect of the present disclosure, there is provided a mobile terminal including: a housing, a first display screen, a second display screen, one or more processors, and a non-tangible computer-readable storage medium for storing a plurality of instructions executable by the one or more processors. The one or more processors may instruct the first display screen to display a current interface on the first display screen. The one or more processors may be configured to obtain information of a second application during the display of the current interface on the first display. The one or more processors may instruct the second display screen to display the information of the second application.

According to a second aspect of the present disclosure, there is provided a method for displaying application information by a terminal includes a first display screen and a second display screen. The first display screen is located on an upper surface of a housing of the mobile terminal and the second display screen is located on a first side surface of the housing. The terminal displays a current interface on the first display screen. The terminal obtains information of a second application during the display of the current interface on the first display. The second application is installed on the mobile terminal. The terminal displays the information of the second application on the second display screen.

According to a third aspect of the present disclosure, there is provided a non-transitory computer-readable medium storing at least one instruction, in which a at least one instruction is loaded and executed by a mobile terminal having one or more processors. The one or more processors perform acts that may include to displaying a current interface on the first display screen. The one or more processors perform acts that may include obtaining information of a second application during the display of the current interface on the first display. The one or more processors perform acts that may include displaying the information of the second application.

It should be understood that the above general description and the following detailed description are merely examples and explanatory and should not be construed as limiting the present disclosure.

DETAILED DESCRIPTION

The present disclosure will be described in further detail with reference to the accompanying drawings, to present the objects, technical aspects, and advantages of the present disclosure more clearly.

The present disclosure will be described in detail herein, examples of which are illustrated in the accompanying drawings. The following description refers to the accompanying drawings in which the same numbers in different drawings represent the same or similar elements unless otherwise indicated. The implementations set forth in the following embodiments do not represent all implementations consistent with the present disclosure. Rather, they are merely examples of devices and methods consistent with certain aspects of the present disclosure as detailed in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Figure 1:
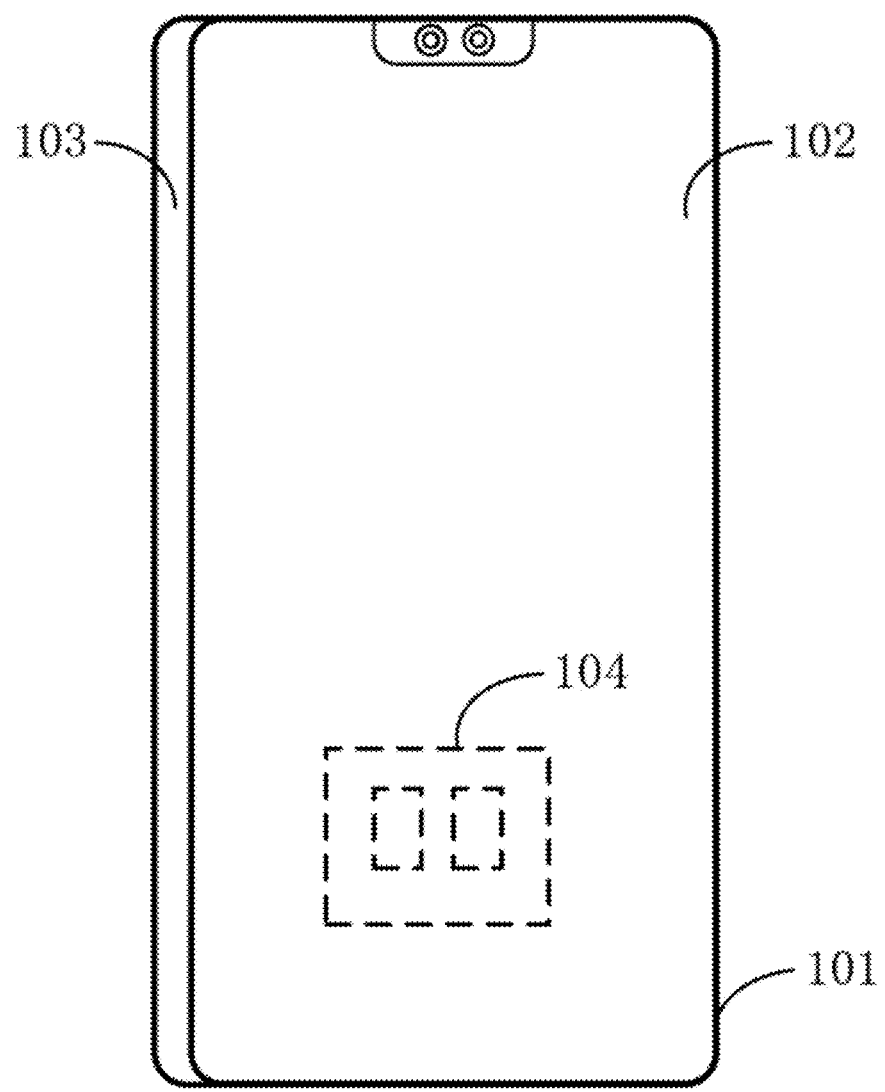
FIG. 1 is a schematic diagram of a mobile terminal, according to an example of the present disclosure.

An embodiment of the present disclosure provides a mobile terminal. Referring to FIG. 1, the mobile terminal includes a housing 101, a first display screen 102, a second display screen 103, and a processor 104.

The processor 104 is disposed in the housing 101, the first display screen 102 is disposed on an upper surface of the housing 101, and the second display screen 103 is disposed on a first side surface of the housing 101.

The first display screen 102 is configured to display a current interface corresponding to a first application running in foreground.

The second display screen 103 is configured to display first application information of an installed second application when the processor 104 obtains the first application information, while the first display screen 102 displays the current interface. First application information may also be referred to as information of the second application.

The first application information may be status information of the second application or notification information sent by a server corresponding to the second application and received by the mobile terminal. The notification information may be a social application message or a push message. For example, when the second application is a social application, the first application information may be the social application message of the social application.

The first side surface may be a left side surface, a right-side surface, an upper side surface, or a lower side surface of the housing 101.

In a possible implementation, the first display screen 102 and the second display screen 103 may be two independent screens, or may be an integrated screen. When the first display screen 102 and the second display screen 103 are the integrated screen, the first display screen 102 and the second display screen 103 may be integrally formed, thereby improving design aesthetics of an appearance of the mobile terminal.

In a possible implementation, an angle between the first display screen 102 and the second display screen 103 is not less than 90°, so that it is convenient for a user to view the application information displayed on the second display screen 103. The angle between the first display screen 102 and the second display screen 103 may be set and changed as required. For example, the angle between the first display screen 102 and the second display screen 103 may be 90°, 100°, or 105°.

A size of the first display screen 102 can be set and changed as required. In the embodiment of the present disclosure, the size of the first display screen 102 is not specifically limited. For example, a length and width of the first display screen 102 may be 12 cm and 6 cm, 13 cm and 7 cm, or 14 cm and 7 cm, respectively. The size of the second display screen 103 can be set and changed as required. In the embodiment of the present disclosure, the size of the second display screen 103 is not specifically limited. The length of the second display screen 103 and the length of the first display screen 102 may be the same. For example, when the length of the first display screen 102 is 12 cm, the length of the second display screen 103 may also be 12 cm; when the length of the first display screen 102 is 13 cm, the length of the second display screen 103 may also be 13 cm. The width of the second display screen 103 may be set and changed as required. For example, the width of the second display screen 103 may be 1.5 cm, 2 cm, or 2.5 cm.

An embodiment of the present disclosure provides a mobile terminal. The mobile terminal includes a housing 101, a first display screen 102, a second display screen 103, and a processor 104. The processor 104 is disposed in the housing 101, the first display screen 102 is disposed on an upper surface of the housing 101, and the second display screen 103 is disposed on a first side surface of the housing 101. The first display screen 102 is configured to display a current interface corresponding to a first application running in foreground, and the second display screen 103 is configured to display a first application information of an installed second application when the processor 104 obtains the first application information, while the first display screen 102 displays the current interface. The mobile terminal may display the first application information of the second application on the second display screen 103 and the application information of the second application can be viewed without any operation, thereby avoiding displaying the first application information while displaying the current interface on the first display screen 102, and thus improving the effect of the user viewing the current interface and the utilization rate of the current interface.

Figure 2:
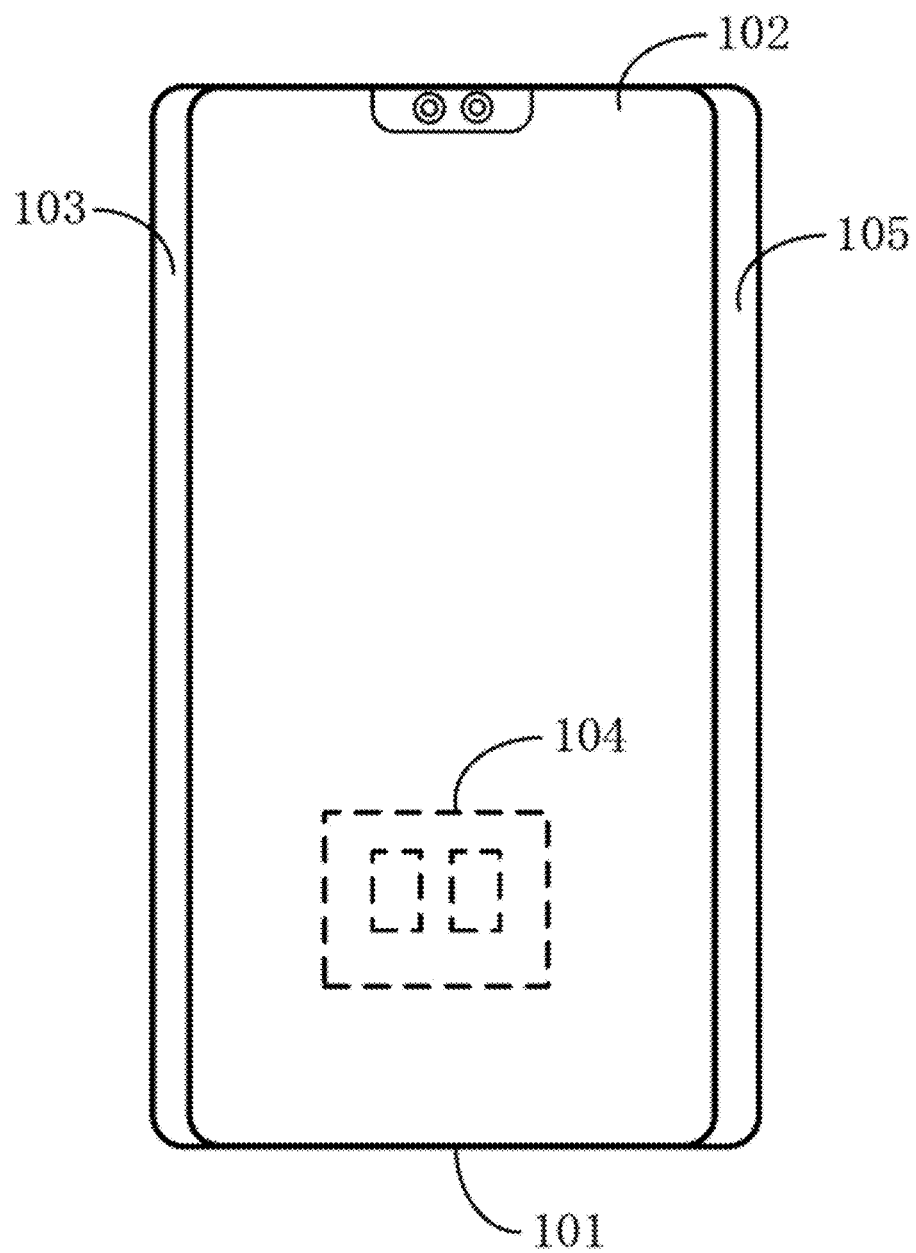
FIG. 2 is a schematic diagram of another mobile terminal, according to an example of the present disclosure.

In a possible implementation, referring to FIG. 2, the mobile terminal further includes a third display screen 105.

The third display screen 105 is disposed on a second side surface of the housing 101, and the second side surface is different from the first side surface. For example, the second side surface is in a location different from the first side surface.

The third display screen 105 is configured to display a second application information of an installed third application when the processor 104 obtains the second application information, while the first display screen 102 displays the current interface. Second application information may also be referred to as information of the second application.

The second display screen 103 is disposed on the first side surface of the housing 101, the third display screen 105 is disposed on the second side surface of the housing 101, and the second side surface is any surface other than the first side surface, which is not limited in the embodiments of the present disclosure. For example, when the first side surface is the left side surface of the housing 101, the second side surface may be the right side surface of the housing 101; or when the first side surface is the right side surface, the second side surface may be the left side surface; or when the first side surface is the upper side surface of the housing 101, the second side surface may be the lower side surface of the housing 101; or when the first side surface is the lower side surface of the housing 101, the second side surface may be the upper side surface of the housing 101. In FIG. 2, it is illustrated as an example that the second display screen 103 is disposed on the left surface of the housing 101 and the third display screen 105 is disposed on the right surface of the housing 101.

In a possible implementation, the third display screen 105 and the first display screen 102 may be two independent screens or an integrated screen. When the third display screen 105 and the first display screen 102 are the integrated screen, the third display screen 105 and the first display screen 102 may be integrally formed, thereby improving the design aesthetics of the appearance of the mobile terminal. In addition, the three screens of the first display screen 102, the second display screen 103, and the third display screen 105 may be an integrated screen, that is, the three screens are integrally formed.

In a possible implementation, an angle between the first display screen 102 and the third display screen 105 is not less than 90°, so that it is convenient for the user to view the application information displayed on the third display screen 105. The angle between the first display screen 102 and the third display screen 105 may be set and changed as required. For example, the angle between the first display screen 102 and the third display screen 105 may be 90°, 95°, or 110°. For easy differentiation, the angle between the first display screen 102 and the second display screen 103 may be referred to as a first angle, and the angle between the first display screen 102 and the third display screen 105 is referred to as a second angle. The first angle and the second angle may be the same or different, which is not limited in the embodiments of the present disclosure. When the first angle and the second angle are the same, the first angle and the second angle may both be 100°, 105°, or 110°. When the second display screen 103 and the third display screen 105 are located on opposite sides of the housing 101, the first angle and the second angle may be the same, that is, the second display screen 103 and the third display screen 105 are symmetrically disposed on both sides of the first display screen 102, thereby improving the design aesthetics of the appearance of the mobile terminal.

The size of the third display screen 105 may be set and changed as required. In the embodiments of the present disclosure, the size of the third display screen 105 is not specifically limited. The size of the third display screen 105 and the size of the second display screen 103 may be the same or different. When the third display screen 105 and the second display screen 103 are located on opposite side surfaces of the housing 101, respectively, the third display screen 105 and the second display screen 103 may be the same; when the third display screen 105 and the second display screen 103 are located on two adjacent side surfaces of the housing 101, respectively, the third display screen 105 and the second display screen 103 may be different.

An embodiment of the present disclosure provides a mobile terminal. The mobile terminal further includes a third display screen 105. The third display screen 105 is disposed on a second side surface of the housing 101, and the second side surface is different from the first side surface. The third display screen 105 is configured to display second application information of an installed third application when the processor 104 obtains the second application information, while the first display screen 102 displays the current interface. The mobile terminal may display the first application information of the second application on the second display screen 103, and the application information of the second application is viewed without any operation, thereby avoiding displaying the first application information while displaying the current interface on the first display screen 102, and thus improving the effect of the user viewing the current interface and the utilization rate of the current interface. In addition, the second application information is displayed on the third display screen 105, and thus the application information of multiple applications can be viewed without operation, which improves the use efficiency of the mobile terminal.

Figure 3:
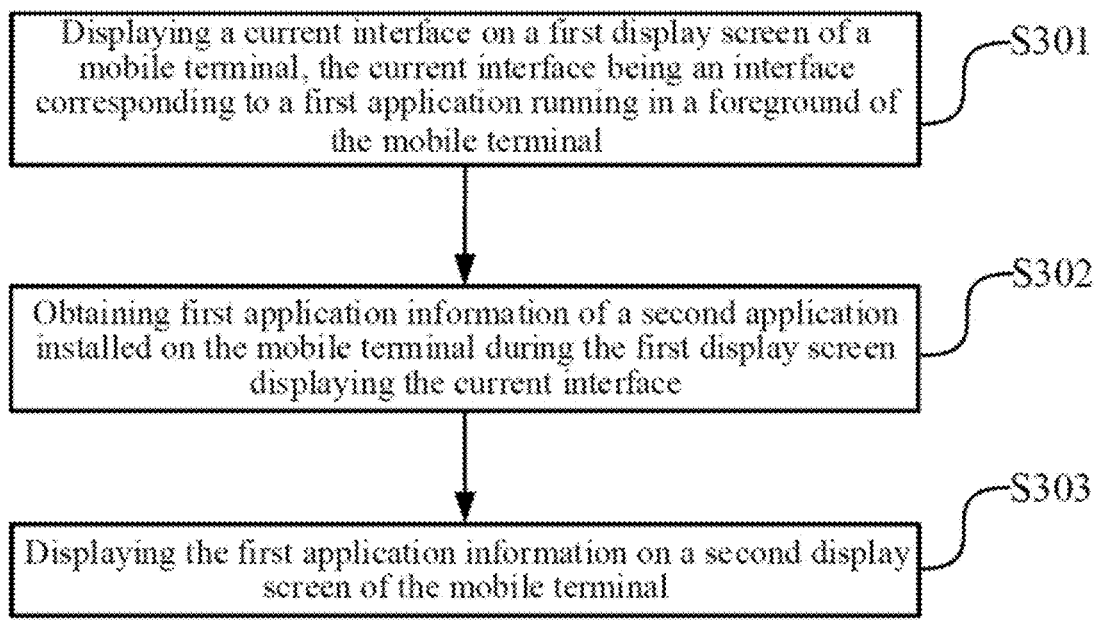
FIG. 3 is a flowchart of a method for displaying application information, according to an example of the present disclosure.

An embodiment of the present disclosure provides a method for displaying application information, which is applied to the above-mentioned mobile terminal. Referring to FIG. 3, the method includes: step 301, displaying a current interface on a first display screen of the mobile terminal, the current interface being an interface corresponding to a first application running in a foreground of the mobile terminal; step 302, obtaining first application information of a second application installed on the mobile terminal during the first display screen displaying the current interface; and step 303, displaying the first application information on a second display screen of the mobile terminal.

In a possible implementation, the first application information is status information, and the obtaining first application information of a second application installed on the mobile terminal correspondingly includes: obtaining an application identification of the second application running in a background of the mobile terminal; and obtaining the status information of the second application according to the application identification of the second application.

In another possible implementation, the first application information is notification information, and the obtaining first application information of a second application installed on the mobile terminal correspondingly includes: receiving the notification information of the second application sent by a server corresponding to the second application.

In another possible implementation, the method further includes: displaying at least one reply content corresponding to the notification information on the second display screen, the at least one reply content including at least one of a text content and an emoji, and sending the reply content to the server when any reply content is triggered; or displaying at least one operation button corresponding to the notification information on the second display screen, and performing an operation instruction corresponding to the operation button when any operation button is triggered.

In another possible implementation, the mobile terminal further includes a third display screen, the third display screen is disposed on a second side surface of the housing, and the second side surface is different from the first side surface. The method further includes, before the displaying the first application information on the second display screen of the mobile terminal: determining a first holding status in which the mobile terminal is held at a current time, and selecting the second display screen corresponding to the first holding status from the second display screen and the third display screen according to the first holding status; or selecting the second display screen set in advance from the second display screen and the third display screen; or selecting the second display screen corresponding to the second application from the second display screen and the third display screen.

In another possible implementation, the displaying the first application information on the second display screen of the mobile terminal includes: displaying the first application information at a specified position on the second display screen based on a screen status of the first display screen.

In another possible implementation, the displaying the first application information at a specified position on the second display screen based on a screen status of the first display screen includes: displaying the first application information on a central portion of the second display screen, when the screen status of the first display screen is a vertical screen status and the second display screen is located on a left side surface of the housing of the mobile terminal; and displaying the first application information on a left half portion of the second display screen, when the screen status of the first display screen is a horizontal screen status and the second display screen is located on an upper side surface of the housing.

In another possible implementation, the method further includes: performing the step of displaying the first application information on the second display screen of the mobile terminal, when the first application information is status information and the second application is an application in a first white list, the first white list storing an application identification of the application information displayed on the second display screen; or performing the step of displaying the first application information on the second display screen of the mobile terminal, when the first application information is notification information and a sender corresponding to the notification information is a user in a second white list, the second white list storing a user identification of the sender of the notification information displayed on the second display screen.

In another possible implementation, the mobile terminal further includes a third display screen, the third display screen is disposed on a second side surface of the housing, and the second side surface is different from the first side surface. The method further includes: obtaining second application information of a third application installed on the mobile terminal during the first display screen displaying the current interface; and displaying the second application information on the third display screen of the mobile terminal.

In another possible implementation, when a priority of the second display screen is greater than a priority of the third display screen, a priority of the second application is greater than a priority of the third application.

In another possible implementation, the method further includes: displaying a first status interface on an upper layer of the current interface when receiving a viewing instruction of the status information of the second application, the first status interface being an interface corresponding to the status information of the second application.

In another possible implementation, an interface for entering the second application is provided on the first status interface, and the method further includes: switching the current interface of the first display screen to an application interface of the second application, when the interface is triggered.

An embodiment of the present disclosure provides a method for displaying application information. By displaying the current interface on the first display screen and displaying the first application information of the second application on the second display screen in the method, the first application information of the second application can be viewed without any operation, thereby avoiding displaying the first application information while displaying the current interface on the first display screen, and thus improving the effect of the user viewing the current interface and the utilization rate of the current interface.

In the present disclosure, in addition to displaying the current interface of the first application on the first display screen, the mobile terminal may also display application information of other applications on other display screens. Correspondingly, when the mobile terminal displays the application information of other applications on the other display screens, there are the following three implementations.

In a first implementation, the mobile terminal includes a second display screen in addition to the first display screen, and the mobile terminal displays the first application information of the second application on the second display screen.

In a second implementation, the mobile terminal includes a third display screen in addition to the first display screen and the second display screen, but the mobile terminal only displays the first application information of the second application on the second display screen.

In a third implementation, the mobile terminal includes the first display screen, the second display screen, and the third display screen. The mobile terminal displays the first application information of the second application on the second display screen and displays the second application information of the third application on the third display screen.

The second implementation is similar to the third implementation. In the present disclosure, and the first implementation and the third implementation are taken as examples for description.

Figure 4:
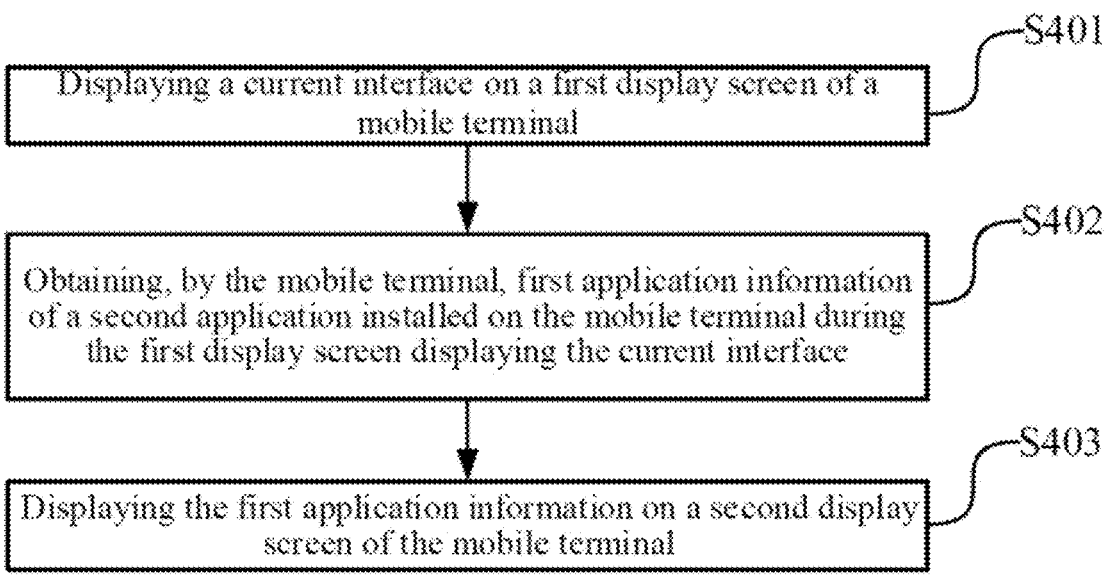
FIG. 4 is a flowchart of a method for displaying application information, according to an example of the present disclosure

An embodiment of the present disclosure provides a method for displaying application information, which is applied to the above-mentioned mobile terminal. Referring to FIG. 4, the embodiment of the present disclosure is described by taking the first implementation as an example. The method includes the following steps.

In step S401, a current interface is displayed on a first display screen of the mobile terminal.

The current interface is an interface corresponding to a first application running in foreground of the mobile terminal. The first application may be any one of a plurality of applications installed on the mobile terminal. When the first application is an entertainment application, the current interface may be a game interface; when the first application is a shopping application, the current interface may be a shopping interface; when the first application is a video application, the current interface may be a video playing interface. In the embodiment of the present disclosure, the first application is not specifically limited.

In step S402, the mobile terminal obtains a first application information of a second application installed on the mobile terminal during the first display screen displaying the current interface.

The first application information may be status information or notification information of the second application. The second application may be any application other than the first application among the plurality of applications installed on the mobile terminal. In the embodiment of the present disclosure, the second application is not specifically limited. The second application may be an application with timeliness within a period of time. For example, the second application may be an ordering application, a travel application, a map application, and the like. When the second application is the travel application, the first application information may be status information of the travel application. The second application may also be an application with persistence. For example, the second application may be a music application, a news application, a social application, or the like. When the second application is the social application, the first application information may be a social application message of the social application. Correspondingly, when the first application information is the status information, this step can be implemented by the following steps one and two.

Step one: The mobile terminal obtains an application identification of the second application running in the background of the mobile terminal.

When the mobile terminal runs the first application in the foreground, it can also run one or more second applications in the background. When there is one second application, the mobile terminal obtains the application identification of the one second application. When there are multiple second applications, the mobile terminal may obtain application identifications of the multiple second applications. Correspondingly, this step may be that correspondence between the application and the application identification is stored in the mobile terminal, and the mobile terminal obtains the application identification corresponding to the at least one second application from the correspondence between the application and the application identification according to the at least one second application running in the background.

Step two: The mobile terminal obtains the status information of the second application according to the application identification of the second application.

The status information of the second application may include the application identification of the second application and a currently running progress of the second application. When there is one application running in the background of the mobile terminal, the mobile terminal may obtain the status information of this application according to the application identification of this application; when there are multiple applications running in the background of the mobile terminal, the mobile terminal may obtain the status information of each application according to the application identification of each application. The mobile terminal may periodically obtain the status information of the application running in the background.

Figure 5:
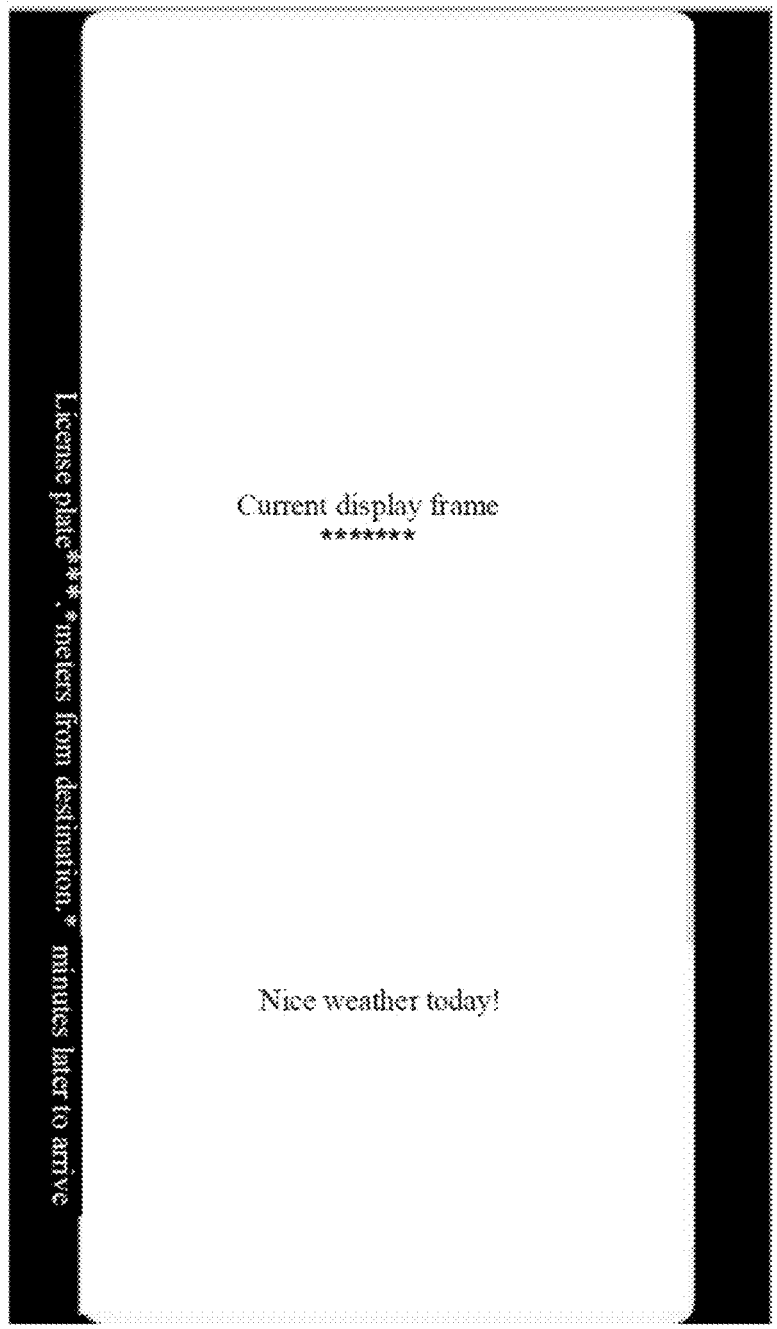
FIG. 5 is a schematic diagram of displaying status information of a travel application on a second display screen, according to an example of the present disclosure
Figure 6:
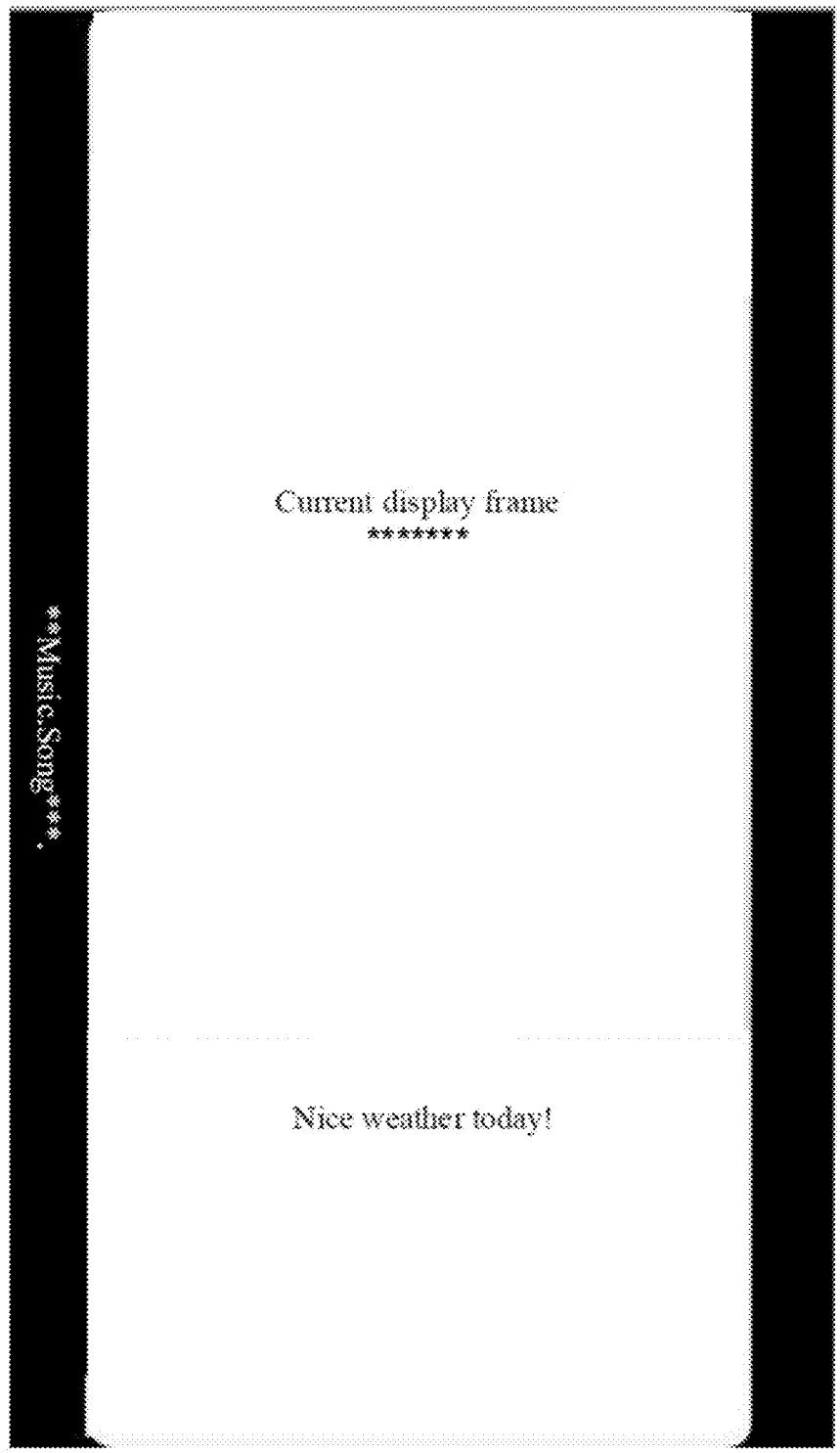
FIG. 6 is a schematic diagram of displaying status information of a music application on a second display screen, according to an example of the present disclosure.

For example, when there is one application running in the background of the mobile terminal, and this application is the travel application, the mobile terminal may obtain the current status information of the travel application according to the application identification of the travel application. Referring to FIG. 5, the status information may include the application identification of the travel application, an identification of the vehicle's license plate, a vehicle type, meters from destination, time length expected to arrive, and other information. When the second application is the music application, the mobile terminal may obtain the current status information of the music application according to the application identification of the music application. Referring to FIG. 6, the status information may include the application identification of the music application, currently playing music and the like. When there are multiple applications running in the background of the mobile terminal, by taking the number of the multiple applications being two as an example, the two applications are the travel application and the music application, respectively, and the mobile terminal may obtain the current status information of the travel application and the current status information of the music application according to the application identification of the travel application and the application identification of the music application.

When the first application information is the notification information, the step S402 may be that: the mobile terminal receives the notification information of the second application sent by a server corresponding to the second application. The notification information may be a call request, a push message, or a social application message. For example, when the second application is a calling application, the notification information may be the call request; when the second application is a social application, the notification information may be the social application message.

It should be noted that when the mobile terminal obtains the first application information of the plurality of second applications, the mobile terminal may select a specified type of application from the plurality of second applications, and the second display screen preferentially displays the specified type of the application. When the number of the specified types of applications is multiple, the mobile terminal may sort the multiple specified types of the applications according to the priority of the application, and the second display screen preferentially displays the application with the higher priority. For example, if the specified types of applications obtained by the mobile terminal are an ordering application and a music application, and the priority of the ordering application is greater than the priority of the music application, the second display screen preferentially displays the application information of the ordering application.

In step S403, the first application information is displayed on the second display screen of the mobile terminal.

In this step, when the mobile terminal displays the first application information on the second display screen, it may either directly display the first application information on the second display screen, or display a simple interface on the second display screen and the first application information is displayed on the simple interface. In addition, the mobile terminal may also determine, according to an information type of the first application information, a display manner corresponding to the information type. For example, when the first application information is status information, the mobile terminal may display the simple interface on the second display screen; and when the first application information is notification information, the mobile terminal may directly display the notification information on the second display screen, which is not specifically limited in the embodiment of the present disclosure. When the second display screen of the mobile terminal obtains application information of at least one other application during displaying the first application information, the first application information and the application information of the at least one application may be displayed on the second display screen at the same time.

In a possible implementation, the mobile terminal may display the first application information at any position on the second display screen, and the mobile terminal may also display the first application information at a specified position on the second display screen. When the mobile terminal displays the first application information at the specified position on the second display screen, the mobile terminal may display the first application information at the specified position on the second display screen based on a screen status of the first display screen. Correspondingly, this step may be that: the first application information may be displayed on a central portion of the second display screen, when the screen status of the first display screen is a vertical screen status and the second display screen is located on the left side surface of the housing of the mobile terminal; and the first application information may be displayed on a left half portion of the second display screen, when the screen status of the first display screen is a horizontal screen status and the second display screen is located on the upper side surface of the housing.

Figure 7:
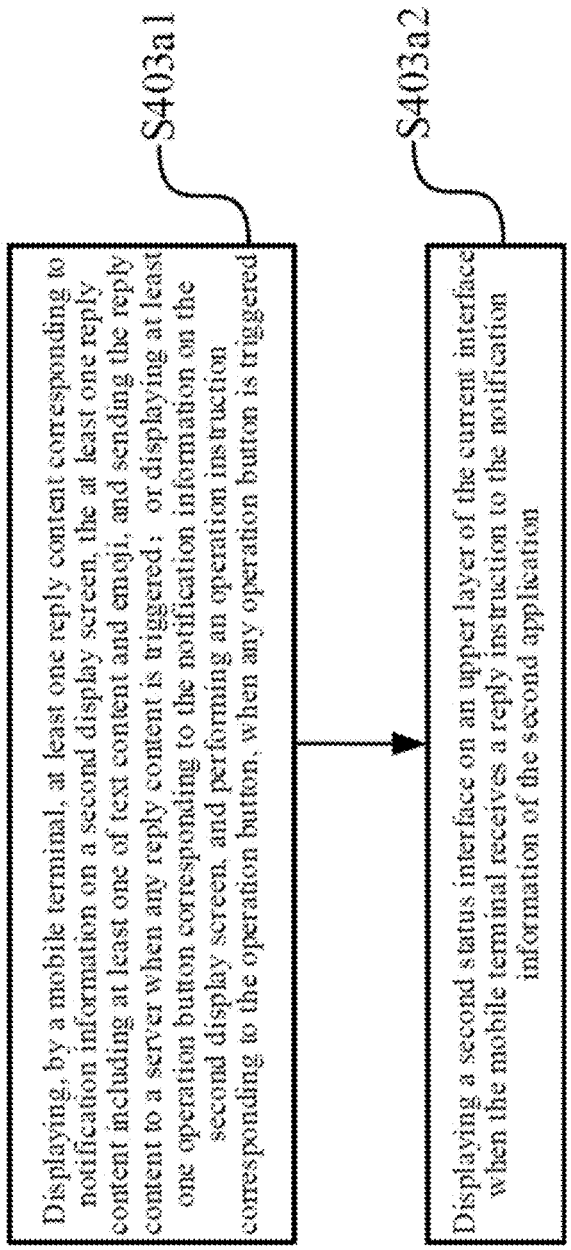
FIG. 7 is a flowchart of displaying first application information on a second display screen of a mobile terminal, according to an example of the present disclosure.

The first application information may be notification information or status information. When the first application information is the notification information, the step S403 may be replaced with the step S403a1. Correspondingly, after the mobile terminal performs the step S402, the step S403a1 may be performed, as shown in FIG. 7.

In step S403a1, the mobile terminal displays at least one reply content corresponding to the notification information on the second display screen, the at least one reply content including at least one of text content and emoji, and when any reply content is triggered, the reply content is sent to a server; or at least one operation button corresponding to the notification information is displayed on the second display screen, and when any operation button is triggered, an operation instruction corresponding to the operation button is performed.

The first application information is the notification information, and the notification information may be a call request, a push message, or a social application message. In a possible implementation, when the notification information is the push message or the social application message, the mobile terminal receives the push message or the social application message sent by the server of the second application, and the mobile terminal may not only display the push message or the social application message on the second display screen, but also display at least one reply content corresponding to the push message on the second display screen. When any reply content is triggered, the mobile terminal sends the reply content to the server of the second application. After receiving the reply content, the server may send the reply content to the mobile terminal that sent the push message. In addition, when the mobile terminal displays the push message or the social application message on the second display screen, the mobile terminal may display the push message or the social application message on the left side of the second display screen and display at least one reply content on the right side of the second display screen. The at least one reply content includes at least one of the text content and the emoji. When the at least one reply content includes both the text content and the emoji, the text content may be located on the right side of the emoji. An input button may also be displayed on the right side of the at least one reply content. When there is no reply content corresponding to the push message or the social application message in the at least one reply content, the user may manually input the reply content by clicking the input button.

In a possible implementation, the mobile terminal may further include a close button on the second display screen, and the user may click the close button to close the notification information, so as to prevent the notification information from affecting the current interface which the user is currently watching or operating. In another possible implementation, the mobile terminal may display the notification information all the time on the second display screen when the user does not perform any operation on the notification information; or, when a display duration of the notification information reaches a first preset duration, the notification information disappears automatically, which is not specifically limited in the embodiment of the present disclosure.

Figure 8:
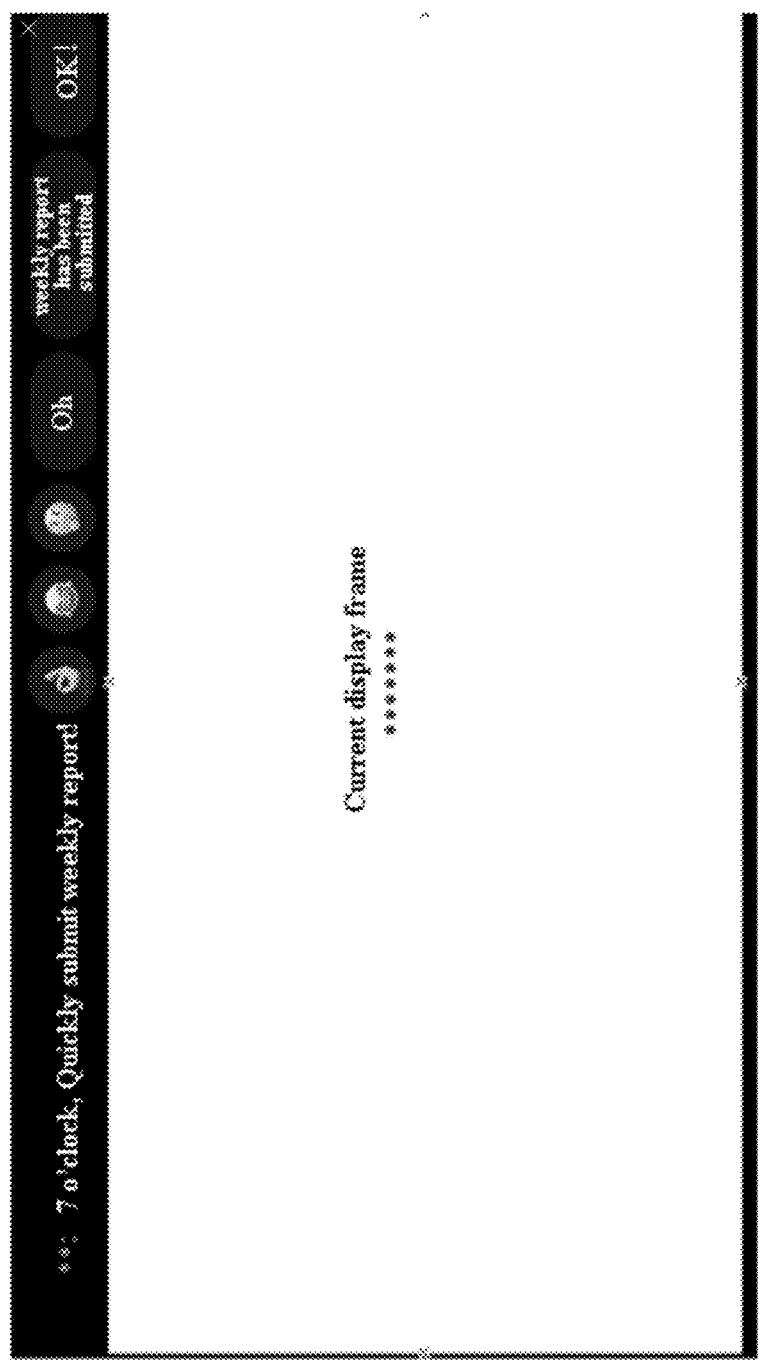
FIG. 8 is a schematic diagram of displaying a social application message on a second display screen, according to an example of the present disclosure.

For example, referring to FIG. 8, the mobile terminal receives a social application message sent by a server of a social application, and displays the social application message on the left half of the second display screen. The content of the social application message is "**: 7 o'clock, Quickly submit weekly report!". The mobile terminal displays at least one reply content corresponding to the social application message in the right half of the second display screen, and the at least one reply content includes text content and emoji, where the text content may be "Oh", "weekly report has been submitted", and "OK". An input button is displayed on the far-right side of the second display screen. The user may select one reply content from multiple reply contents, such as "weekly report has been submitted." When this reply content is triggered, the mobile terminal sends the reply content to the server. Or when there is no reply content corresponding to the social application message in the at least one reply content, the user may click the input button to manually enter the reply content.

In another possible implementation, when the notification information is the call request, the mobile terminal may display at least one operation button corresponding to the call request on the second display screen. When any operation button is triggered, the mobile terminal executes an operation instruction corresponding to the operation button.

Figure 9:
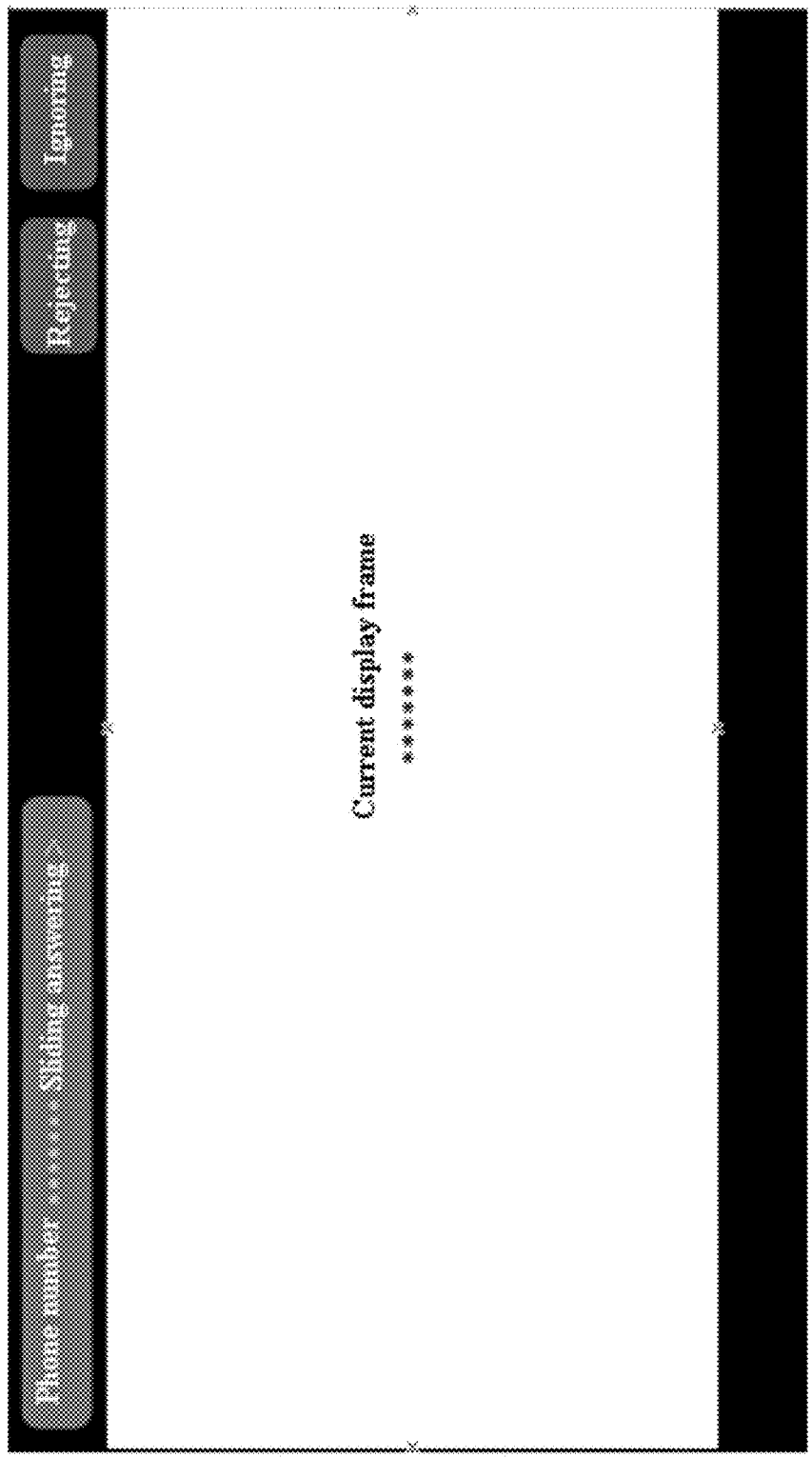
FIG. 9 is a schematic diagram of displaying a call request on a second display screen, according to an example of the present disclosure

In this implementation, the mobile terminal may display a first operation button on the left half of the second display screen, the first operation button is used to answer the call. A second operation button may be displayed on the right half of the second display screen. The second operation button is used to reject the call. A third operation button is displayed on the right of the second operation button, and the third operation button is used to ignore the call. Referring to FIG. 9, the first operation button may display a call number and an answering manner. The answering manner may be sliding answering or tapping answering. When the first operation button is triggered, the call is accepted. When the call is accepted, the mobile terminal directly displays a call interface on the second display screen, so as to avoid affecting the current interface displayed on the first display screen. In addition, when the number belongs to the number in an address book of the mobile terminal, a name of the number in the address book may also be displayed on the second display screen. When the number does not belong to the number in the address book, a type of the number may also be displayed on the second display screen. For example, the type of the number is takeout, courier, or customer service. The second operation button may display rejection of answering, and the user may refuse to answer the call by triggering the second operation button. The third operation button may display ignoring of the call, and the user may ignore the call by triggering the third operation button.

In a possible implementation, when the at least one reply content is triggered after the mobile terminal finishes the step S403a1, the mobile terminal may display the reply content on the second display screen, and the reply content may be displayed on the second display screen all the time. Or when a display duration of the reply content reaches a first preset duration, the reply content disappears automatically. When the mobile terminal receives the push message or the social application message sent by the server of the second application again, the mobile terminal displays the just received push message or social application message on the second display screen. Or, when the close button is triggered, no push message or social application message is displayed on the second display screen; or when the input button is triggered, the server of the second application sends a reply instruction to the mobile terminal, and the mobile terminal receives the reply instruction to execute the step S403a2.

In step S403a2, when the mobile terminal receives a reply instruction to the notification information of the second application, a second status interface is displayed on an upper layer of the current interface.

When the input button is triggered, the server of the second application sends a reply instruction to the mobile terminal. The mobile terminal receives the reply instruction sent by the server of the second application, and overlays a transparent interface on the upper layer of the current interface displayed by the first display screen. A second status interface corresponding to the reply instruction of the notification information is displayed on the transparent interface. A size of the transparent interface is the same as the size of the current interface, but the size of the second status interface is smaller than the size of the current interface. The second status interface may be provided with a close button to close the second status interface. When the close button is triggered, the mobile terminal closes the second status interface and continues to display the current interface on the first display screen. Alternatively, by clicking on any position other than the second status interface in the transparent interface, the mobile terminal is triggered to close the second status interface and continue to display the current interface on the first display screen. In addition, an interface for entering a second application may be provided on the second status interface. When the interface is triggered, the mobile terminal executes the step S403a3.

In step S403a3, when the interface for entering the second application on the second status interface is triggered, the first display screen is switched from the current interface to the application interface of the second application.

The interface on the second status interface is used to enter the second application. When the interface is triggered, the first display screen is switched from the current interface to the application interface of the second application.

Figure 10:
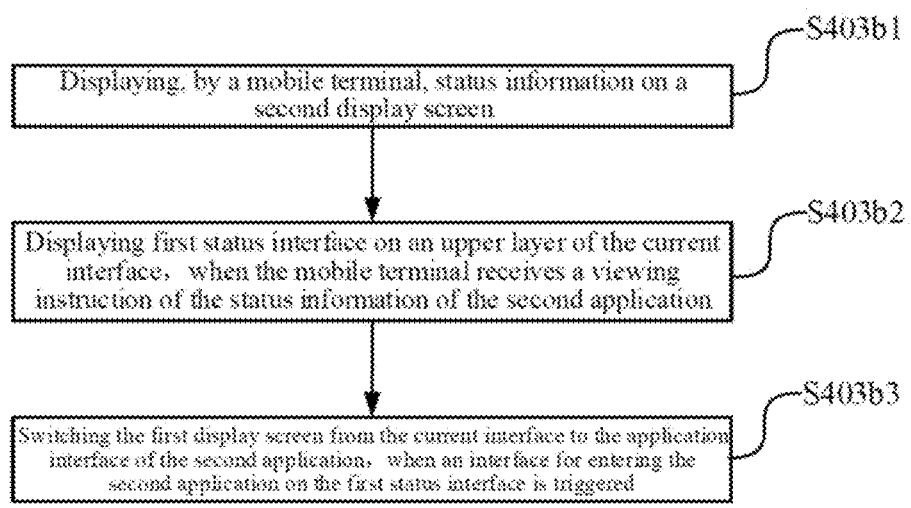
FIG. 10 is a flowchart of displaying first application information on a second display screen of a mobile terminal, according to an example of the present disclosure.

In a possible implementation, when the first application information is the status information, the step S403 may be replaced with the step S403b1. Correspondingly, after finishing the step S402, the mobile terminal may perform the step S403b1, referring to FIG. 10.

In step S403b1, the mobile terminal displays the status information on the second display screen.

When the mobile terminal displays the status information on the second display screen, the status information may be displayed directly on the second display screen, or a simple interface of the status information may be displayed on the second display screen. In addition, when the mobile terminal displays the status information on the second display screen, the status information may be displayed all the time, or may disappear automatically when a display duration of the status information reaches a second preset duration. In addition, when the status information is changed, the mobile terminal may display the updated status information on the second display screen, and the status information may be periodically updated. The status information of the second application on the second display screen may be updated from initial status information corresponding to the second application to final status information. When the status information is updated to the final status information, the status information of the second application is not displayed on the second display screen, and the status information of a next application may be displayed on the second display screen. In addition, when the status information is updated to the final status information, the mobile terminal may also enable a reminder mechanism, which may be a vibration reminder, a voice reminder, and the like. The reminder mechanism is used to remind the user that the status information of the second application has reached the final status information, which is convenient for the user to check in time. For example, when the second application is an ordering application, the initial status information of the ordering application is the status information of the order received by the merchant, the final status information is the status information of the order delivery, the second display screen displays the status information of the ordering application between the initial status information and the final status information. When the final status information is displayed on the second display screen, the order delivery may be reminded by voice to remind the user.

When the mobile terminal displays the simple interface of the status information on the second display screen, and the position where the status information is displayed on the simple interface is not triggered, the status information may be displayed on the second display screen all the time. When the position where the status information is displayed on the simple interface is triggered, the server of the application of the status information sends a viewing instruction to the mobile terminal. Alternatively, the simple interface may also be provided with an operation button. When the operation button is triggered, the server of the application of the status information sends the viewing instruction to the mobile terminal. When the operation button is not triggered, the status information is continuously displayed on the second display screen. When the server of the second application sends the viewing instruction to the mobile terminal, the mobile terminal performs the step S403b2 upon receiving the viewing instruction.

In step S403b2, when the mobile terminal receives the viewing instruction of the status information of the second application, the first status interface is displayed on an upper layer of the current interface.

When the mobile terminal receives the viewing instruction of the status information of the second application, the mobile terminal may overlap a transparent interface on the upper layer of the current interface displayed by the first display screen, and displays the first status interface corresponding to the viewing instruction of the status information on the transparent interface. The first status interface is provided with an interface for entering the second application. When the interface is triggered, the mobile terminal executes the step S403b3. The remaining steps are similar to the step S403a2, and are not repeated here.

Figure 11:
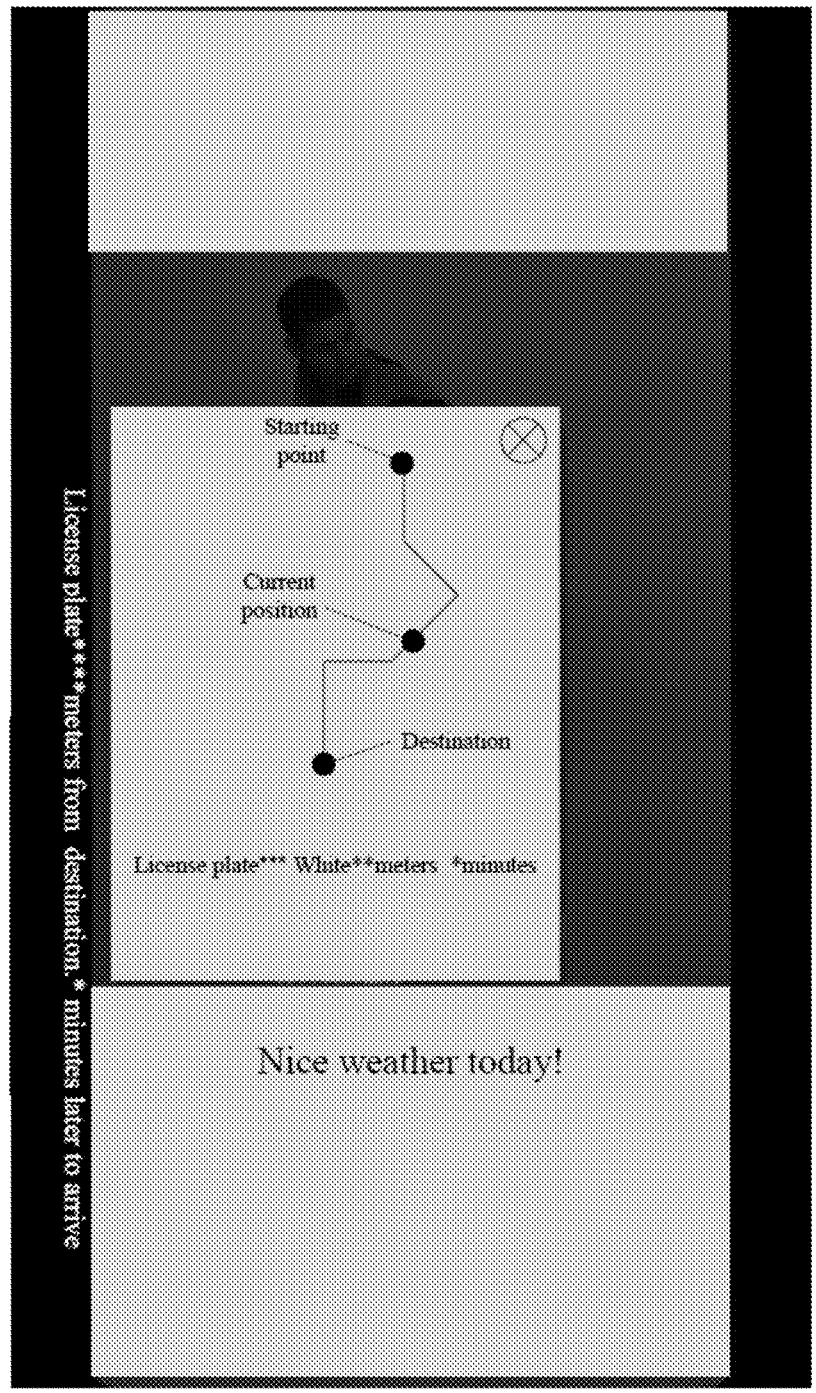
FIG. 11 is a schematic diagram of displaying a status interface of a travel application on a current interface, according to an example of the present disclosure.
Figure 12:
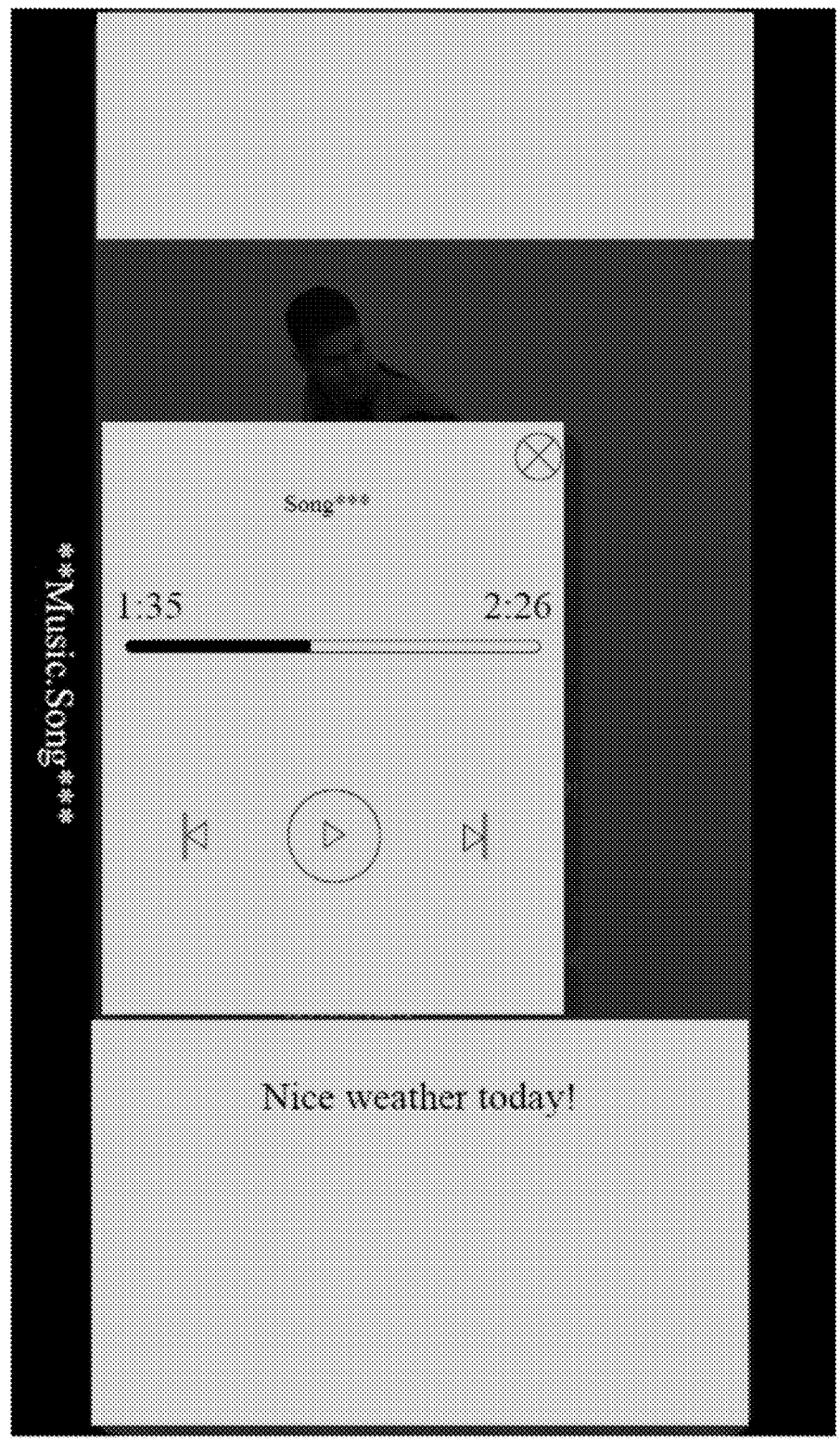
FIG. 12 is a schematic diagram of displaying a status interface of a music application on a current interface, according to an example of the present disclosure.

For example, when the current interface displayed on the first display screen is the interface displayed on the first display screen in FIG. 5, and the status information displayed on the second display screen is the status information of the current travel shown in FIG. 5, referring to FIG. 11, when the mobile terminal receives the viewing instruction of the status information of the travel, the status interface corresponding to the status information of the travel is displayed on the current interface displayed on the first display screen, and a current position of the vehicle, a distance between the current position and the destination, a license plate of the vehicle, an appearance of the vehicle, a predicted arrival time and the like may be displayed on the status interface. When the current interface displayed on the first display screen is the interface displayed on the first display screen in FIG. 6, and the status information displayed on the second display screen is the status information of the currently playing music shown in FIG. 6, referring to FIG. 12, when the mobile terminal receives the viewing instruction of the currently playing music, the status interface corresponding to the currently playing music is displayed on the current interface displayed on the first display screen. The status interface may display a playing progress, a played time length and a remaining played time length of the music.

In step S403b3, when the interface for entering the second application on the first status interface is triggered, the first display screen is switched from the current interface to the application interface of the second application.

Figure 13:
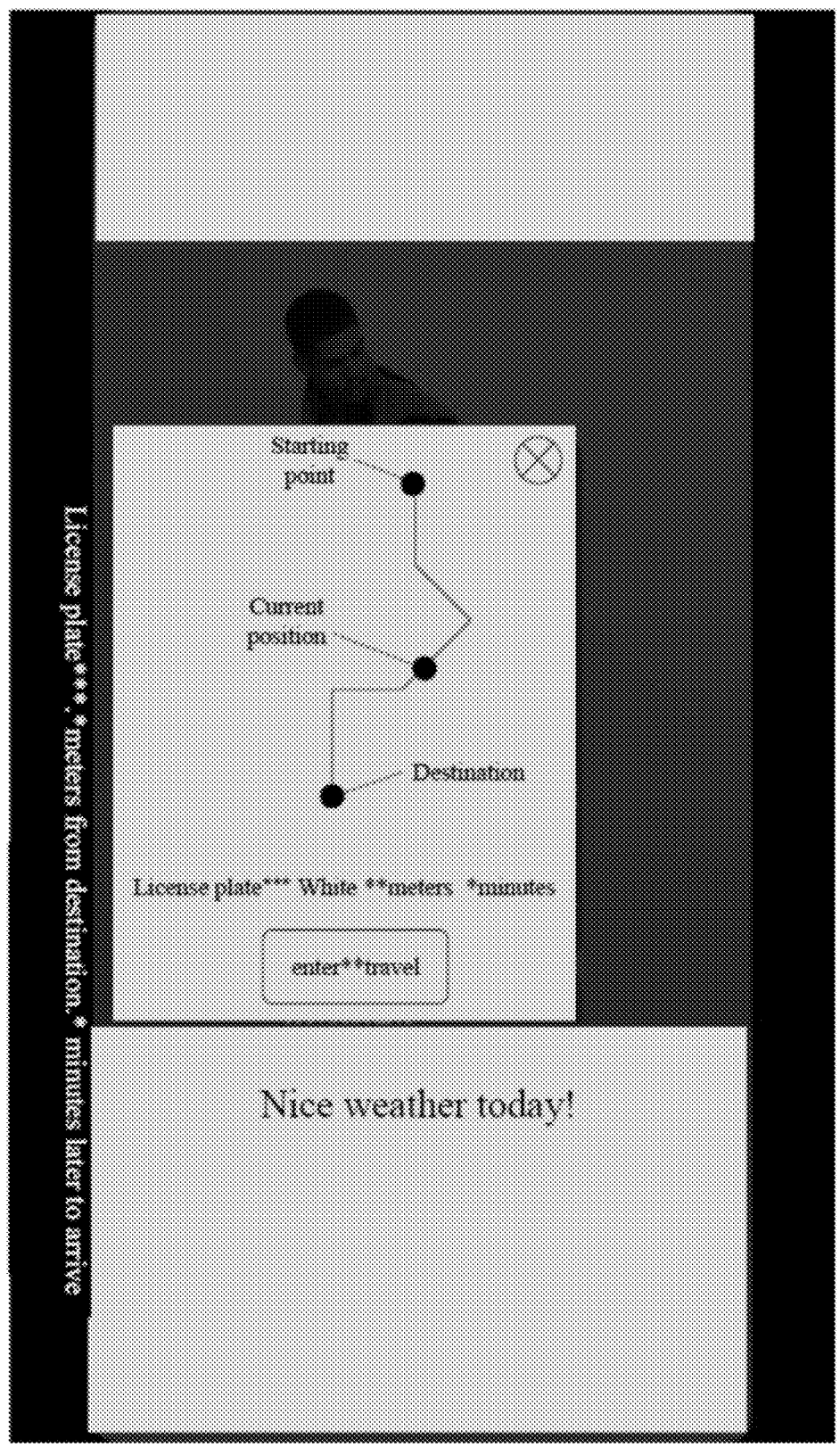
FIG. 13 is a schematic diagram of displaying an interface for entering a travel application on a status interface of the travel application, according to an example of the present disclosure.
Figure 14:
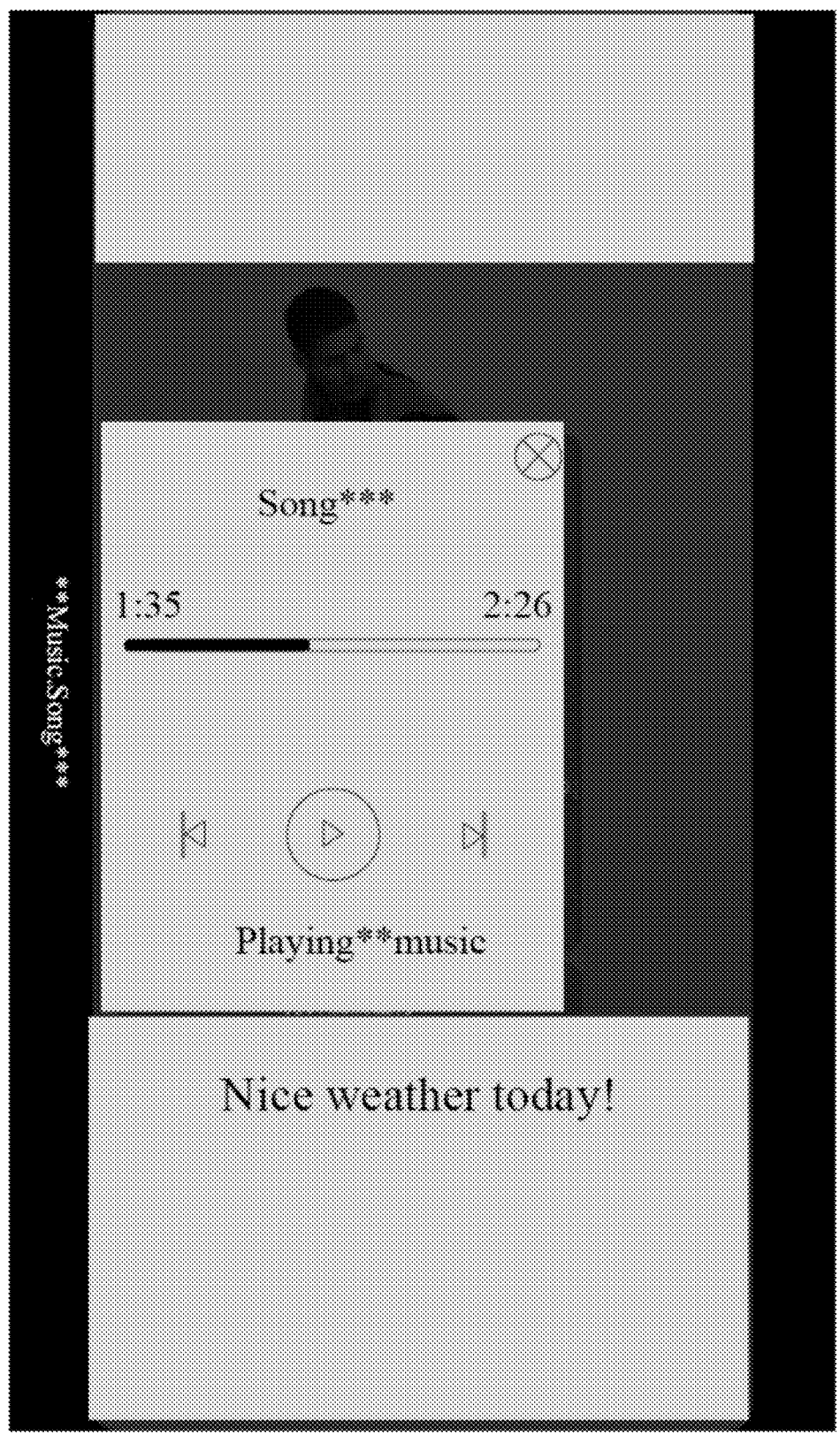
FIG. 14 is a schematic diagram of displaying an interface for entering a music application on a status interface of the music application, according to an example of the present disclosure.

The first status interface is provided with an interface for entering the second application. When the interface is triggered, the first display screen is switched from the current interface to the application interface of the second application. For example, when the second application is a travel application, and the first status interface is the status interface shown in FIG. 11, referring to FIG. 13, the interface for entering the travel application is also provided on the status interface. When the interface is triggered, the first display screen is switched from the current interface to the application interface of the travel application. When the second application is a music application, and the first status interface is the status interface shown in FIG. 12, referring to FIG. 14, the interface for entering the music application is provided on the status interface. When the interface is triggered, the first display screen is switched from the current interface to the application interface of the music application.

It should be noted that the first application information of all the second applications may be displayed on the second display screen, or only the first application information of a part of the second applications specified by the user is displayed on the second display screen. Correspondingly, when the first application information of the part of the second applications specified by the user is displayed on the second display screen, after obtaining the first application information of the second application, the mobile terminal may screen the second application corresponding to the first application information to determine whether the second application belongs to the application in a first white list, or determine whether a sender of the first application information belongs to the user in the second white list. That is, before the step S403 is performed, the mobile terminal determines whether the second application belongs to the application in the first white list, or determines whether the sender of the first application information belongs to the user in the second white list. Only when it is determined that the second application belongs to the application in the first white list, or that the sender of the first application information belongs to the user in the second white list, the first status information of the second application is displayed on the second display screen. Correspondingly, this step can be the followings.

When the first application information is the status information and the second application belongs to the application in the first white list, the first application information is displayed on the second display screen of the mobile terminal, and the first white list stores an application identification of the application information displayed on the second display screen; or when the first application information is the notification information and the sender corresponding to the notification information belongs to the user in the second white list, the first application information is displayed on the second display screen of the mobile terminal, and the second white list stores a user identification of the sender of the notification information displayed on the second display screen.

The first white list stores the application identification of the application information displayed on the second display screen. The mobile terminal may query the application identification of the second application from the first white list according to the application identification of the second application. When the application identification of the second application is found from the first white list, the mobile terminal determines that the second application belongs to the application in the first white list. The application identification in the first white list may be a default application identification of the mobile terminal or a user-defined application identification, which is not limited in the embodiment of the present disclosure. The second white list stores the user identification of the application information displayed the on the second display screen. The mobile terminal may query the user identification of the sender from the second white list according to the user identification of the sender corresponding to the notification information. When the user identification of the sender is found from the second white list, the mobile terminal determines the sender of the notification information belongs to the user in the second white list, and then the mobile terminal displays the notification information on the second display screen.

It should be further noted that when the call request is displayed on the second display screen, the call request may not be screened, and all call requests are displayed; or only the call request in the second white list is displayed; or the call request outside a blacklist is displayed, and the blacklist includes the user identification of harassing call users.

Due to a large number of applications installed on the mobile terminal, only the status information of a part of the applications instead of the status information of all the applications is displayed on the second display screen. Therefore, the mobile terminal may first determine whether the second application belongs to the application in the first white list, or whether the sender of the first application information belongs to the user in the second white list. When the second application belongs to the application in the first white list, or when the sender of the first application information belongs to the user in the second white list, the status information of the second application is displayed on the second display screen, which improves the display efficiency of the status information.

It should be further noted that that when the mobile terminal determines that the second application does not belong to the application in the first white list and the sender of the first application information does not belong to the user in the second white list, the mobile terminal does not display the first application information on the second display screen.

An embodiment of the present disclosure provides a method for displaying application information. By displaying the current interface on the first display screen and displaying the first application information of the second application on the second display screen in the method, the first application information of the second application may be viewed without any operation, thereby avoiding displaying the first application information while displaying the current interface on the first display screen, and thus improving the effect of the user viewing the current interface and the utilization rate of the current interface.

Figure 15:
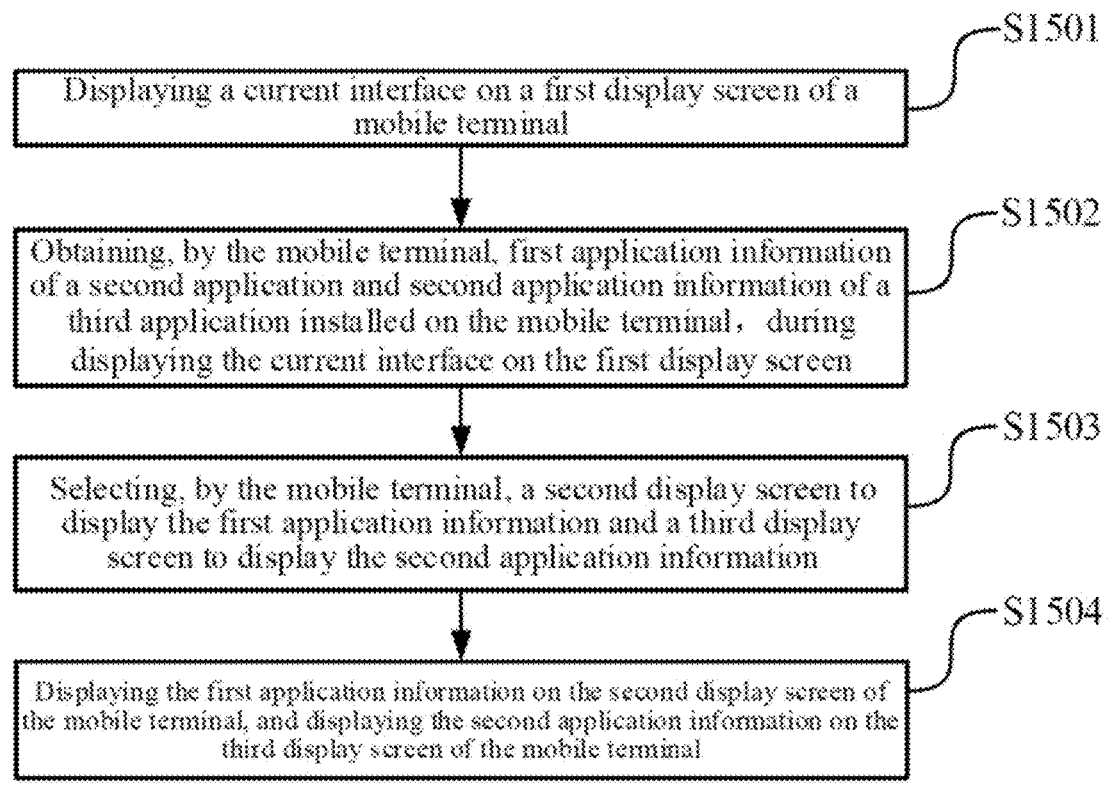
FIG. 15 is a flowchart of a method for displaying application information, according to an example of the present disclosure.

An embodiment of the present disclosure provides a method for displaying application information, which is applied to the above-mentioned mobile terminal. Referring to FIG. 15, the embodiment of the present disclosure is described by taking the third implementation as an example. The method includes the following steps.

In step S1501, a current interface is displayed on a first display screen of the mobile terminal.

This step is the same as the step S401, and details are not described herein again.

In step S1502, the mobile terminal obtains first application information of a second application and second application information of a third application installed on the mobile terminal during the first display screen displaying the current interface.

The process of obtaining the first application information by the mobile terminal in this step is the same as the process of obtaining the application information by the mobile terminal in the step S402, and the process of obtaining the second application information by the mobile terminal is similar to the process of obtaining the first application information by the mobile terminal in the step S402, which is not repeated herein.

After the mobile terminal obtains the first application information and the second application information, it may display the first application information on any display screen and display the second application information on another display screen; or, it may determine the display screen to display the first application information and the display screen to display the second application information, and after determining the display screen corresponding to the application information, the application information is displayed. Correspondingly, after finishing the step S1502, the mobile terminal may execute the step S1504. That is, after obtaining the first application information and the second application information, the mobile terminal displays the first application information on any display screen and displays the second application information on another display screen. After finishing the step S1502, the mobile terminal may execute the step S1503. That is, after the mobile terminal determines the display screen corresponding to the application information, the mobile terminal displays the application information, which is not specifically limited in the embodiment of the present disclosure.

In step S1503, the mobile terminal selects a second display screen to display the first application information and a third display screen to display the second application information.

The mobile terminal also includes a second display screen and a third display screen. The second display screen is disposed on the first side surface of the housing, and the third display screen is disposed on the second side surface of the housing. The first side surface and the second side surface are different.

In a possible implementation, the mobile terminal selects the second display screen that displays the first application information from the second display screen and the third display screen. The following three implementations may be used by the mobile terminal to achieve the above.

In a first implementation, the mobile terminal determines a first holding status in which the mobile terminal is held at the current time, and selects the second display screen corresponding to the first holding status from the second display screen and the third display screen according to the first holding status.

In this implementation, the first holding status in which the mobile terminal is held at the current time may be a status in which the mobile terminal is held by the left hand, and the first display screen is in a vertical screen status; or the mobile terminal is held by the right hand and the first display screen is in the vertical screen status; or the mobile terminal is held by the left hand and the first display screen is in a horizontal screen status; or the mobile terminal is held by the right hand and the first display screen is in the horizontal screen status.

When the second display screen and the third display screen are disposed on the left and right sides of the housing, the mobile terminal is held by the left hand and the first display screen is in the vertical screen status, the display screen on the right side of the housing may be used as the second display screen, so that the user may view the first application information without manual operation. When the second display screen and the third display screen are disposed on the left and right sides of the housing, the mobile terminal is held by the left hand and the first display screen is in the horizontal screen status, the second display screen and the third display screen are located on the upper and lower sides of the first display screen. At this time, the display screen on the upper side of the first display screen, that is, the display screen on the right side of the housing may be used as the second display screen, so that the user may view the first application information without manual operation.

In a second implementation, the mobile terminal selects a second display screen set in advance from the second display screen and the third display screen.

In this implementation, the second display screen is disposed on the first side surface of the housing, the third display screen is disposed on the second side surface of the housing, and the first side surface and the second side surface are different. The mobile terminal determines in advance that the first application information is displayed on a designated side surface of the housing, and the mobile terminal sets the designated side surface as the second display screen, so that after obtaining the first application information, the mobile terminal may directly display it on the second display screen set in advance without selection again, thereby improving the convenience of displaying application information on the display screen. For example, if the mobile terminal determines in advance that the first application information is displayed on the left side of the housing, the left side surface of the housing is set as the second display screen; or, the mobile terminal determines in advance that the first application information is displayed on the right side of the housing, then the right side surface of the housing is set as the second display screen.

In a third implementation, the mobile terminal selects a second display screen corresponding to the second application from the second display screen and the third display screen.

In this implementation, the first application information of multiple applications may be displayed on the second display screen, and the first application information of multiple applications may be displayed on the third display screen. The mobile terminal may set in advance that the first application information corresponding to a first number of designated applications is displayed on the second display screen, and the first application information corresponding to a second number of designated applications is displayed on the third display screen. When the second application corresponding to the first application information belongs to one of the first number of designated applications, the mobile terminal determines that the display screen corresponding to the first application information of the second application is the second display screen. For example, the mobile terminal sets in advance the application information of the travel application, the application information of the ordering application, and the application information of the map application to be displayed on the second display screen, and sets in advance the application information of the music application, the application information of the social application, and the application information of the news application to be displayed on the third display screen. When the application information of the second application obtained by the mobile terminal is the application information of the travel application, the mobile terminal determines that the display screen corresponding to the application information of the travel application is the second display screen. When the application information of the application obtained by the mobile terminal is the application information of the music application, the mobile terminal does not display the application information of the music application, since the display screen corresponding to the application information of the music application is not the second display screen.

It should be noted that the manner in which the mobile terminal selects the third display screen for displaying the second application information is similar to the manner in which the mobile terminal selects the second display screen for displaying the first application information, and details are not described herein again.

In a possible implementation, the mobile terminal may further determine the display screen of the application information according to the type of the application information. The application information includes the notification information and the status information. The mobile terminal may determine that the second display screen displays the notification information and the third display screen displays the status information; or the second display screen displays the status information and the third display screen displays the notification information, which is not specifically limited in the embodiment of the present disclosure. For example, the second display screen displays the status information of applications such as the travel application and the ordering application, and the third display screen displays the notification information of applications such as the social application and the news application.

In another possible implementation, the mobile terminal may further determine the display screen for displaying the application information according to a priority of the display screen. For example, when the priority of the second display screen is greater than the priority of the third display screen, the priority of the second application is greater than the priority of the third application. For example, the second display screen preferentially displays the application with timeliness, such as the travel application and the ordering application. The priority of the application with timeliness is greater than the priority of the application with persistence. When the mobile terminal obtains the status information of the travel application and the status information of the music application at the same time, since the travel application is an application with timeliness, the priority of the travel application is greater than the priority of the music application. Therefore, the travel application is displayed on the second display screen, and the music application is displayed on the third display screen.

In step S1504, the first application information is displayed on the second display screen of the mobile terminal, and the second application information is displayed on the third display screen of the mobile terminal.

In this step, the mobile terminal may display the first application information and the second application information at the same time, or may display the first application information when the first application information is obtained and display the second application information when the second application information is obtained. The sequence of displaying the first application information and the second application information is not specifically limited.

The step of the mobile terminal displaying the first application information on the second display screen is the same as the step of the mobile terminal displaying the first application information on the second display screen in the above step S403, and the step of the mobile terminal displaying the second application information on the third display screen is similar to the step of the mobile terminal displaying the first application information on the second display screen in the above step S403, which is not repeated herein.

It should be noted that, in addition to the first display screen, the mobile terminal includes a second display screen and a third display screen. The implementation in which the mobile terminal only displays the application information on the second display screen includes: displaying the current interface on the first display screen of the mobile terminal. During the mobile terminal displaying the current interface on the first display screen, the mobile terminal obtains the first application information of the second application, and the mobile terminal may directly display the first application information on the second display screen, or may first determine the second display screen corresponding to the first application information, and then display the first application information on the second display screen. This implementation is similar to the embodiment of the present disclosure, and is not repeated here.

An embodiment of the present disclosure provides a method for displaying application information. By displaying the current interface on the first display screen and displaying the first application information of the second application on the second display screen in the method, the first application information of the second application may be viewed without any operation, thereby avoiding displaying the first application information while displaying the current interface on the first display screen, and thus improving the effect of the user viewing the current interface and the utilization rate of the current interface. In addition, the second application information is displayed on the third display screen, and the application information of multiple applications may be viewed without operation, which improves the use efficiency of the mobile terminal.

All the above-mentioned embodiments may be used in any combination to form the present disclosure, which will not be described in detail here.

Figure 16:
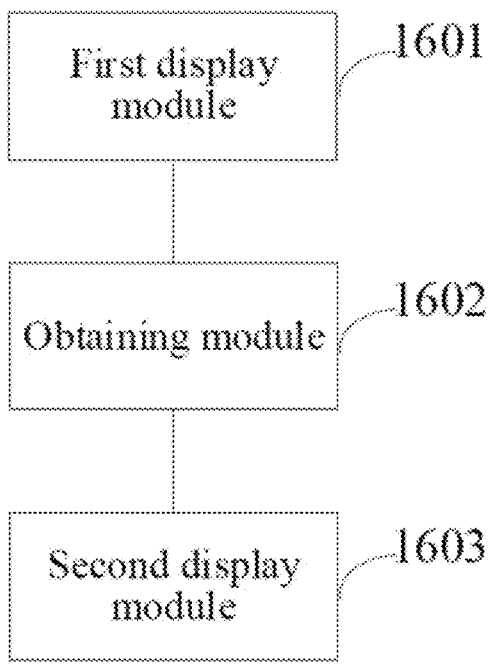
FIG. 16 is a schematic structural diagram of a device for displaying application information, according to an example of the present disclosure.

An embodiment of the present disclosure provides a device for displaying application information. Referring to FIG. 16, the device includes: a first display module 1601, configured to display a current interface on a first display screen of a mobile terminal, the current interface being an interface corresponding to a first application running in a foreground of the mobile terminal; an obtaining module 1602, configured to obtain first application information of a second application installed on the mobile terminal during the first display screen displaying the current interface; and a second display module 1603, configured to display the first application information on a second display screen of the mobile terminal.

In a possible implementation, the first application information is status information.

Correspondingly, the obtaining module 1602 is further configured to obtain an application identification of the second application running in a background of the mobile terminal; and obtain the status information of the second application according to the application identification of the second application.

In another possible implementation, the first application information is notification information.

Correspondingly, the obtaining module 1602 is further configured to receive the notification information of the second application sent by a server corresponding to the second application.

In another possible implementation, the device further includes a third display module, configured to display at least one reply content corresponding to the notification information on the second display screen, the at least one reply content including at least one of text content and emoji, and send the reply content to the server when any reply content is triggered; or display at least one operation button corresponding to the notification information on the second display screen, and perform an operation instruction corresponding to the operation button, when any operation button is triggered.

In another possible implementation, the mobile terminal further includes a third display screen, the third display screen is disposed on a second side surface of the housing, and the second side surface is different from the first side surface.

The device also includes a first selection module, configured to determine a first holding status in which the mobile terminal is held at a current time, and select a second display screen corresponding to the first holding status from the second display screen and the third display screen according to the first holding status; or select the second display screen set in advance from the second display screen and the third display screen; or select the second display screen corresponding to the second application from the second display screen and the third display screen.

In another possible implementation, the second display module 1603 is further configured to display the first application information at a specified position on the second display screen based on a screen status in which the first display screen is.

In another possible implementation, the second display module 1603 is further configured to display the first application information on a central portion of the second display screen, when the screen status of the first display screen is a vertical screen status and the second display screen is located on the left side surface of the housing of the mobile terminal; and display the first application information on a left half portion of the second display screen, when the screen status of the first display screen is a horizontal screen status and the second display screen is located on the upper side surface of the housing.

In another possible implementation, the device further includes a fourth display module, configured to display the first application information on the second display screen of the mobile terminal, when the first application information is the status information and the second application belongs to an application in a first white list, the first white list storing the application identification of the application information displayed on the second display screen; or display the first application information on the second display screen of the mobile terminal, when the first application information is the notification information, and a sender corresponding to the notification information belongs to a user in a second white list, the second white list storing a user identification of the sender of the notification information displayed on the second display screen.

In another possible implementation, the mobile terminal further includes a third display screen, the third display screen is disposed on a second side surface of the housing, and the second side surface is different from the first side surface.

The device also includes a fifth display module, configured to obtain second application information of a third application installed on the mobile terminal during the first display screen displaying the current interface; and display the second application information on the third display screen of the mobile terminal.

In another possible implementation, when a priority of the second display screen is greater than a priority of the third display screen, a priority of the second application is greater than a priority of the third application.

In another possible implementation, the device further includes a sixth display module, configured to display a first status interface on an upper layer of the current interface, when receiving a viewing instruction of the status information of the second application, the first status interface being an interface corresponding to the status information of the second application.

In another possible implementation, an interface for entering the second application is provided on the first status interface, and the device further includes a switching module, configured to switch the first display screen from the current interface to an application interface of the second application, when the interface is triggered.

An embodiment of the present disclosure provides a device for displaying application information. By displaying the current interface on the first display screen and displaying the first application information of the second application on the second display screen in the device, the first application information of the second application may be viewed without any operation, thereby avoiding displaying the first application information while displaying the current interface on the first display screen, and thus improving the effect of the user viewing the current interface and the utilization rate of the current interface.

It should be noted that the device for displaying application information provided in the foregoing embodiment only takes the foregoing divided functional modules as an example when displaying the application information. In actual applications, the functions described above may be allocated to different functional modules as required, that is, the internal structure of the mobile terminal is divided into different functional modules to complete all or part of the functions described above. In addition, the device for displaying application information and the method for displaying application information provided by the foregoing embodiments belong to the same concept. For specific implementation processes, please refer to the method embodiments, and details are not described herein again.

Figure 17:
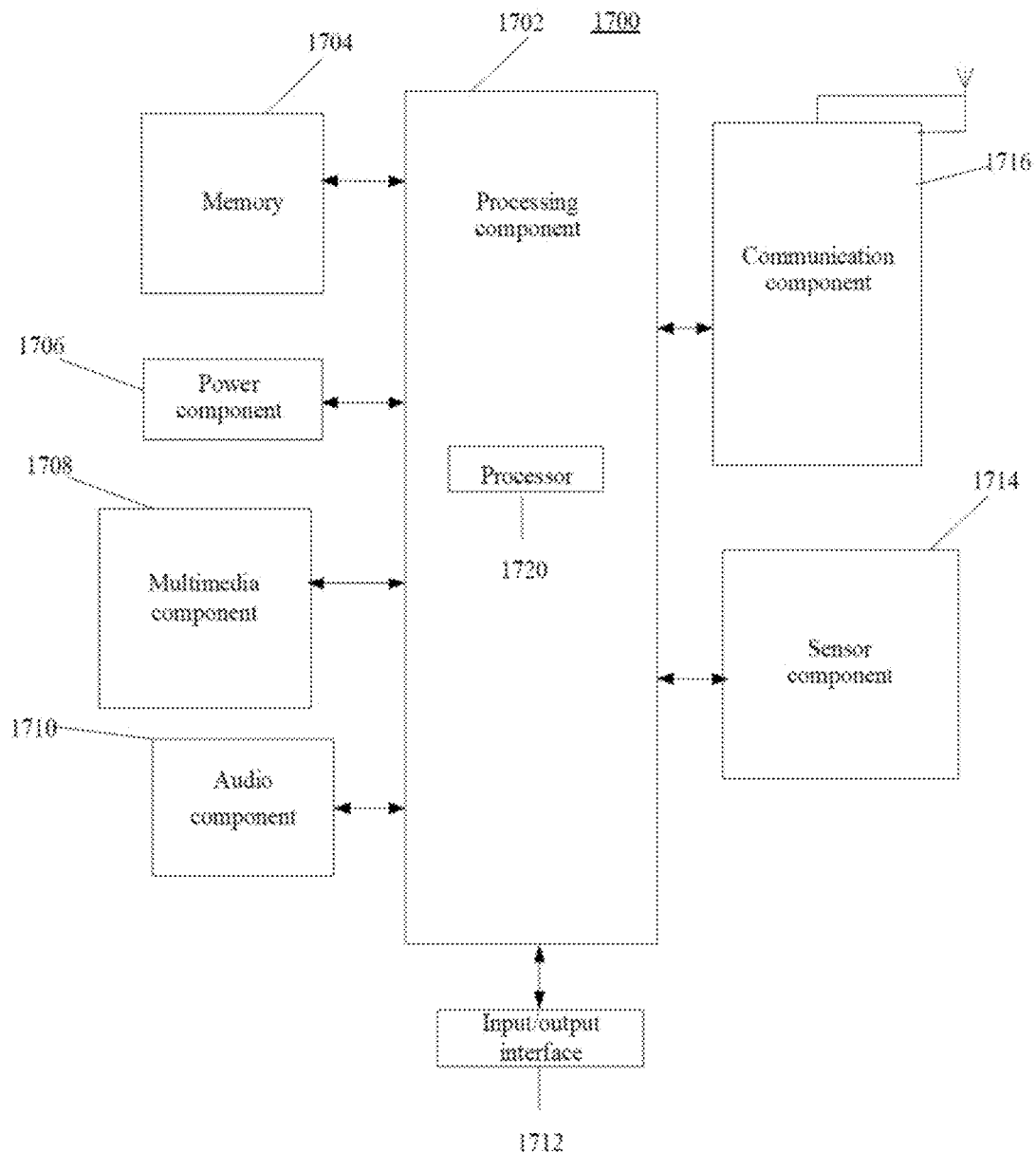
FIG. 17 is a structural block diagram of a mobile terminal, according to an example of the present disclosure.

FIG. 17 is a block diagram showing a mobile terminal 1700 according to an embodiment. For example, the mobile terminal 1700 may be a mobile phone, a computer, a digital broadcasting terminal, a messaging device, a game console, a tablet device, a medical device, a fitness device, a personal digital assistant, and the like.

Referring to FIG. 17, the mobile terminal 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the mobile terminal 1700, such as operations associated with display, telephone calls, data communications, camera operations, and recording operations. The processing component 1702 may include one or more processors 1720 to execute instructions to perform all or part of the steps in the above described methods. Moreover, the processing component 1702 may include one or more modules to facilitate interaction between the processing component 1702 and other components. For example, the processing component 1702 may include a multimedia module to facilitate the interaction between the multimedia component 1708 and the processing component 1702.

The memory 1704 is configured to store various types of data to support the operation of the mobile terminal 1700. Examples of such data include instructions for any application or method operated on device 1700, such as contact data, phone book data, messages, pictures, videos, and the like. The memory 1704 may be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the mobile terminal 1700. The power component 1706 may include a power management system, one or more power sources, and other components associated with generation, management, and distribution of power in the mobile terminal 1700.

The multimedia component 1708 includes a screen providing an output interface between the mobile terminal 1700 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1708 includes a front camera and/or a rear camera. When the mobile terminal 1700 is in an operation mode, such as a photographing mode or a video mode, the front camera and/or the rear camera may receive external multimedia datum. Each of the front camera and the rear camera may be a fixed optical lens system or have focus and optical zoom capability.

The audio component 1710 is configured to output and/or input an audio signal. For example, the audio component 1710 includes a microphone (MIC) configured to receive an external audio signal when the mobile terminal 1700 is in an operation mode, such as a call mode, a recording mode, and a voice recognition mode. The received audio signal may be further stored in the memory 1704 or sent via the communication component 1716. In some embodiments, the audio component 1710 also includes a speaker for outputting the audio signal.

The I/O interface 1712 provides an interface between the processing component 1702 and peripheral interface modules, such as a keyboard, a click wheel, a button, and the like. The button may include, but is not limited to, a home button, a volume button, a starting button, and a locking button.

The sensor component 1714 includes one or more sensors for providing status assessments of various aspects of the mobile terminal 1700. For example, the sensor component 1714 may detect an opening/closing status of the mobile terminal 1700, relative positioning of components, such as the display and the keypad of the mobile terminal 1700. The sensor component 1714 may also detect a change in position of one component of the mobile terminal 1700 or the mobile terminal 1700, the presence or absence of user contact with the mobile terminal 1700, an orientation, or an acceleration/deceleration of the mobile terminal 1700, and a change in temperature of the mobile terminal 1700. The sensor component 1714 may include a proximity sensor configured to detect the presence of nearby objects without any physical contact. The sensor component 1714 may also include a light sensor, such as a CMOS or CCD image sensor, configured to be used in imaging applications. In some embodiments, the sensor component 1714 may also include an accelerometer sensor, a gyroscope sensor, a magnetic sensor, a pressure sensor, or a temperature sensor.

The communication component 1716 is configured to facilitate wired or wireless communication between the mobile terminal 1700 and other devices. The mobile terminal 1700 may access a wireless network based on a communication standard, such as WiFi, 2G or 3G, or a combination thereof. In an embodiment, the communication component 1716 receives broadcast signals or broadcast-associated information from an external broadcast management system via a broadcast channel. In an embodiment, the communication component 1716 also includes a near field communication (NFC) module to facilitate short-range communications.

In an embodiment, the mobile terminal 1700 may be implemented with one or more application specific integrated circuits (ASICs), a digital signal processor (DSP), a digital signal processing device (DSPDs), a programmable logic device (PLD), a field programmable Gate array (FPGA), a controller, a microcontroller, a microprocessor or other electronic components, to perform the above methods.

In an embodiment, a non-transitory computer-readable storage medium including instructions is also provided. When the foregoing instructions are executed by the processor 1720 of the mobile terminal 1700, the mobile terminal 1700 can execute operations in the method for displaying application information in the above embodiments. For example, the non-transitory computer readable storage medium may be a ROM, a random-access memory (RAM), a CD-ROM, a magnetic tape, a floppy disc, and an optical data storage device.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for displaying application information, comprising:
displaying, on a mobile terminal comprising a first display screen and a second display screen, a current interface on the first display screen, wherein the first display screen is disposed on an upper surface of a housing of the mobile terminal and the second display screen is disposed on a first side surface of the housing, wherein the current interface being an interface corresponding to a first application running in foreground of the mobile terminal;
obtaining, at the mobile terminal during the display of the current interface on the first display screen, information of a second application, wherein the second application is installed on the mobile terminal; and
displaying, on the second display screen of the mobile terminal, the information of the second application,
wherein the mobile terminal further comprises:
a third display screen, wherein the third display screen is disposed on a second side surface of the housing, and wherein the second side surface is in a location different from the first side surface, and wherein the method further comprises:
determining, at the mobile terminal before displaying the information of the second application on the second display screen of the mobile terminal, a first holding status in which the mobile terminal is held at a current time, and either
selecting, at the mobile terminal, the second display screen corresponding to the first holding status from the second display screen and the third display screen according to the first holding status;
selecting, at the mobile terminal, the second display screen set in advance from the second display screen and the third display screen; or
selecting, at the mobile terminal, the second display screen corresponding to the second application from the second display screen and the third display screen.

2. The method according to claim 1, wherein obtaining, at the mobile terminal, the information of the second application comprises:
obtaining, at the mobile terminal, an application identification of the second application running in background of the mobile terminal; and
obtaining, at the mobile terminal, status information of the second application according to the application identification of the second application, wherein the information of the second application comprises the status information of the second application.

3. The method according to claim 2, further comprising:
displaying, on the mobile terminal, a first status interface on an upper layer of the current interface when receiving a viewing instruction of the status information of the second application, wherein the first status interface comprises an interface corresponding to the status information of the second application.

4. The method according to claim 3, wherein an interface for entering into the second application is provided on the first status interface, and wherein the method further comprises:
switching, at the mobile terminal when the interface for entering into the second application is triggered, the first display screen from the current interface to an application interface of the second application.

5. The method according to claim 1, wherein obtaining, at the mobile terminal, information of the second application comprises:
receiving, at the mobile terminal, notification information of the second application sent by a server corresponding to the second application, wherein the information of the second application comprises the notification information of the second application.

6. The method according to claim 5, further comprising:
displaying, on the mobile terminal, at least one reply content corresponding to the notification information of the second application on the second display screen, wherein the at least one reply content comprising at least one of a text content and an emoji; and
sending, from the mobile terminal, the at least one reply content to the server when a reply content is triggered, or
displaying, on the mobile terminal, at least one operation button corresponding to the notification information of the second application on the second display screen; and
performing, at the mobile terminal, an operation instruction corresponding to the at least one operation button when an operation button is triggered.

7. The method according to claim 1, wherein displaying, on the second display screen of the mobile terminal, the information of the second application comprises:
displaying, on the mobile terminal, the information of the second application at a specified position on the second display screen based on a screen status of the first display screen.

8. The method according to claim 7, wherein displaying, on the mobile terminal, the information of the second application at the specified position on the second display screen based on the screen status of the first display screen comprises:
displaying, on the mobile terminal, the information of the second application on a central portion of the second display screen, when the screen status of the first display screen comprises a vertical screen status and the second display screen is located on a left side surface of the housing of the mobile terminal; and
displaying, on the mobile terminal, the information of the second application on a left half portion of the second display screen, when the screen status of the first display screen comprises a horizontal screen status and the second display screen is located on an upper side surface of the housing.

9. The method according to claim 1, further comprising either:
displaying, on the mobile terminal, the information of the second application on the second display screen of the mobile terminal when the information of the second application comprises status information and the second application comprises an application in a first white list, wherein the first white list comprises an application identification of the application information displayed on the second display screen; or displaying, on the second display screen of the mobile terminal, the information of the second application when the information of the second application comprises notification information and when a sender corresponding to the notification information comprises a user in a second white list, wherein the second white list comprises a user identification of the sender of the notification information displayed on the second display screen.

10. The method according to claim 1, wherein the mobile terminal further comprises:
a third display screen, wherein the third display screen is disposed on a second side surface of the housing, and wherein the second side surface is in a location different from the first side surface; and wherein the method further comprises:
obtaining, at the mobile terminal during the display of the current interface on the first display screen, information of a third application, wherein the third application is previously installed on the mobile terminal; and
displaying, on the third display screen of the mobile terminal, the information of the third application.

11. The method according to claim 10, wherein when a priority of the second display screen is greater than a priority of the third display screen, and wherein a priority of the second application is greater than a priority of the third application.

12. A mobile terminal, comprising:
a first display screen;
a second display screen, wherein the first display screen is disposed on an upper surface of a housing of the mobile terminal and the second display screen is disposed on a first side surface of the housing;
one or more processors; and
a non-transitory computer-readable storage medium for storing instructions executable by the one or more processors,
wherein the one or more processors are configured to:
instruct the first display screen to display a current interface, the current interface being an interface corresponding to a first application running in foreground of the mobile terminal;
obtain, during the display of the current interface on the first display screen, information of a second application, wherein the second application is installed on the mobile terminal;
instruct the second display to display the information of the second application on the second display screen of the mobile terminal;
determine, before displaying the information of the second application on the second display screen of the mobile terminal, a first holding status in which the mobile terminal is held at a current time, wherein the mobile terminal further comprises a third display screen disposed on a second side surface of the housing, and wherein the second side surface is in a location different from the first side surface; and either
select the second display screen corresponding to the first holding status from the second display screen and the third display screen according to the first holding status;
select the second display screen set in advance from the second display screen and the third display screen; or
select the second display screen corresponding to the second application from the second display screen and the third display screen.

13. The mobile terminal according to claim 12, wherein the one or more processors are configured to:
obtain an application identification of the second application running in background of the mobile terminal; and
obtain status information of the second application according to the application identification of the second application, wherein the information of the second application comprises the status information of the second application.

14. The mobile terminal according to claim 12, wherein the one or more processors are configured to:
receive, at the mobile terminal, notification information of the second application sent by a server corresponding to the second application, wherein the information of the second application comprises the notification information of the second application.

15. The mobile terminal according to claim 14, wherein the one or more processors are further configured to:
instruct the second display screen to display at least one reply content corresponding to the notification information of the second application on the second display screen, wherein the at least one reply content comprising at least one of a text content and an emoji; and
send the at least one reply content to the server when a reply content is triggered, or
instruct the second display screen to display at least one operation button corresponding to the notification information of the second application on the second display screen; and
perform an operation instruction corresponding to the at least one operation button when an operation button is triggered.

16. The mobile terminal according to claim 12, wherein the one or more processors are configured to:
instruct the second display screen to display the information of the second application at a specified position on the second display screen based on a screen status of the first display screen.

17. The mobile terminal according to claim 16, wherein the one or more processors are configured to:
instruct the second display screen to display the information of the second application on a central portion of the second display screen, when the screen status of the first display screen comprises a vertical screen status and the second display screen is located on a left side surface of the housing of the mobile terminal; and
instruct the second display screen to display the information of the second application on a left half portion of the second display screen, when the screen status of the first display screen comprises a horizontal screen status and the second display screen is located on an upper side surface of the housing.

18. A non-transitory computer-readable storage medium, when at least one instruction is stored in the computer-readable storage medium, and the at least one instruction is loaded and executed by a mobile terminal having one or more processors to perform acts comprising:
displaying, a current interface on a first display screen of the mobile terminal on the mobile terminal comprising a first display screen and a second display screen, a current interface on the first display screen, wherein the first display screen is disposed on an upper surface of a housing of the mobile terminal and the second display screen is disposed on a first side surface of the housing, wherein the current interface being an interface corresponding to a first application running in foreground of the mobile terminal;

obtaining, at the mobile terminal during the display of the current interface on the first display screen, information of a second application, wherein the second application is installed on the mobile terminal; and displaying the information of the second application on the second display screen of the mobile terminal;

determining, at the mobile terminal before displaying the information of the second application on the second display screen of the mobile terminal, a first holding status in which the mobile terminal is held at a current time, and either selecting, at the mobile terminal, the second display screen corresponding to the first holding status from the second display screen and a third display screen of the mobile terminal according to the first holding status, wherein the third display screen is disposed on a second side surface of the housing, and wherein the second side surface is in a location different from the first side surface;

selecting, at the mobile terminal, the second display screen set in advance from the second display screen and the third display screen; or selecting, at the mobile terminal, the second display screen corresponding to the second application from the second display screen and the third display screen.

* * * * *